(12) United States Patent
Loc et al.

(10) Patent No.: US 7,477,621 B1
(45) Date of Patent: Jan. 13, 2009

(54) SYSTEM AND METHOD FOR ESTIMATING BANDWIDTH REQUIREMENTS OF AND ALLOCATING BANDWIDTH TO COMMUNICATION DEVICES OPERATING IN A NETWORK

(75) Inventors: Peter Loc, Cupertino, CA (US); Timothy J. Donovan, Livermore, CA (US); Milind Kopikare, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 890 days.

(21) Appl. No.: 10/934,526

(22) Filed: Sep. 7, 2004

(51) Int. Cl.
*H04Q 7/00* (2006.01)
*H04B 7/212* (2006.01)

(52) U.S. Cl. ........................ 370/329; 370/338; 370/341; 370/348

(58) Field of Classification Search ........................ None
See application file for complete search history.

(56) References Cited

U.S. PATENT DOCUMENTS 5,295,140 A * 3/1994 Crisler et al. ................ 370/443
5,594,738 A * 1/1997 Crisler et al. ................ 370/347
5,742,492 A * 4/1998 Akazawa et al. .............. 363/26
6,836,469 B1 * 12/2004 Wu ............................. 370/322

OTHER PUBLICATIONS

"System Requirment for IEEE 802.20 Mobile Broadband Wireless Access Systems—Version 14," *IEEE* 802.20-PD-06, Jul. 16, 2004.
"802.16™ IEEE Standard for Local and metropolitan area networks—Part 16: Air Interface for Fixed Broadband Wireless Access Systems" *IEEE Standards*, Oct. 1, 2004.

* cited by examiner

*Primary Examiner*—Chi H. Pham
*Assistant Examiner*—Soon D. Hyun

(57) ABSTRACT

A system for allocating bandwidth in a network includes a base station. The system also includes a plurality of stations in communication with the base station. During a measurement period, the base station monitors an amount of information communicated by each of the plurality of stations to determine bandwidth required by each of the plurality of stations. After the measurement period, the base station transmits a bandwidth allocation message to the plurality of stations allocating bandwidth to each of the plurality of stations for transmitting information during respective timeslots specified in the bandwidth allocation message.

178 Claims, 6 Drawing Sheets

SYSTEM AND METHOD FOR ESTIMATING BANDWIDTH REQUIREMENTS OF AND ALLOCATING BANDWIDTH TO COMMUNICATION DEVICES OPERATING IN A NETWORK

BACKGROUND

1. Field of the Invention

The present invention relates to information communication systems. More particularly, the present invention relates to a system and method for estimating bandwidth requirements of and allocating bandwidth to communication devices operating in a network.

2. Background Information

A conventional wireless local area network (WLAN) is based on a cellular architecture in which the system is divided into cells. Each cell, referred to as a Basic Service Set (BSS), is controlled by a Base Station, referred to as an Access Point (AP). The APs of the cells are connected to each other through a suitable type of backbone, referred to as a Distribution System (DS). The entire interconnected WLAN, including the different cells, their respective APs and the DS is referred to as an Extended Service Set (ESS).

One or more clients or stations within a cell can communicate using a carrier sense multiple access with collision avoidance (CSMA/CA) protocol for medium access control. In a CSMA/CA protocol, a station desiring to transmit senses the channel. If the channel is busy (i.e., some other station is transmitting), then the station will defer its transmission to a later time. If the channel is sensed to be free at that time, then the station is allowed to transmit. The CSMA/CA protocol works well when the channel is not heavily loaded, allowing the stations to transmit with minimal delay. However, two or more stations may transmit at the same time, causing collisions, if the stations sense that the channel is free and decide to transmit at once.

To overcome such problems, conventional WLANs use a collision avoidance mechanism with a positive acknowledgment scheme. In such a scheme, a station desiring to transmit will sense the channel. If the channel is busy, then the station will defer transmission. If the channel is free for a specified amount of time, then the station (the "sending station") is allowed to transmit. The receiving station will check the cyclic redundancy code (CRC) of the received frame and send an acknowledgment frame (ACK). If the sending station receives the ACK, then no collision has occurred. However, if the sending station does not receive the ACK, then the sending station will retransmit the frame until it is acknowledged or thrown away after a given number of retransmissions. However, in a WLAN, all stations may not be able to hear each other. Thus, a station may desire to transmit and senses the channel to be free, although the channel may not necessarily be free.

To reduce the probability of two or more stations colliding because they cannot hear each other, conventional WLANs use a virtual carrier sense mechanism. In such a mechanism, a station that desires to transmit will first transmit a short control frame, referred to as a Request to Send (RTS). The RTS includes the source, the destination and the duration of the frame to be transmitted and the respective ACK. If the channel is free, the destination station will respond with a response control frame referred to as a Clear To Send (CTS). The CTS includes the same duration information as the RTS. All stations receiving either the RTS and/or CTS will set their respective virtual carrier sense indication, referred to as Network Allocation Vector (NAV), for the given duration, and will use this information when sensing the channel. The virtual carrier sense mechanism reduces the probability of a collision in the receiver area by a station that cannot be heard by the transmitter to the short duration of the RTS transmission, because the station will hear the CTS packet and "back off" the channel until the end of the transaction. A backoff method is used to resolve contention between different stations desiring access to the channel. A binary exponential backoff algorithm requires each station, when the channel is busy, to choose a random number between zero and a given number, and wait for this number of time slots before accessing the channel, checking whether another station has accessed the channel before transmitting.

The above discussion applies to the Distributed Coordinated Function (DCF) mode. In the DCF mode, there is no central control, and stations compete for transmission time. In contrast, in the Point Coordinated Function (PCF) mode, the AP polls the stations, inquiring whether any of the stations have frames to transmit. Since transmission order is completely controlled by the AP in PCF mode, no collisions occur. In PCF mode, the AP broadcasts a beacon frame periodically. The beacon frame contains various system parameters. The beacon frame also invites stations to sign up for polling service. Once a station has signed up for polling service at a certain rate, the station is allocated a certain fraction of the total bandwidth available for transmission.

Conventional WLANs use an interframe time interval to allow the DCF and PCF modes to coexist within a cell. After a frame is transmitted, a given amount of dead time is required before any station can transmit a frame. The shortest interval is the Short InterFrame Spacing (SIFS) time. SIFS is used to allow stations in a single dialog the chance to go first, including letting the receiver send a CTS to respond to a RTS, letting the receiver send an ACK for a frame fragment or full data frame, and letting the sender of a fragment burst transmit the next fragment without having to send a RTS again. There is always exactly one station that is entitled to respond after a SIFS interval. If the station fails to make use of its chance to transmit and a PCF InterFrame Spacing (PIFS) time elapses (equal to SIFS plus a specified slot time), the AP may send a beacon frame or a poll frame. Such a mechanism allows a station sending a data frame or frame fragment sequence to finish its frame without other stations interfering, but gives the AP a chance to access the channel when the previous sender is done without having to compete with the stations. If the AP has nothing to transmit and a DCF InterFrame Spacing (DIFS) time elapses (equal to PIFS plus one timeslot), any station may attempt to acquire the channel to send a new frame. Contention rules apply, and the binary exponential backoff algorithm may be needed if a collision occurs. The longest time interval is the Extended InterFrame Spacing (EIFS) time interval. EIFS is used only by a station that has received a bad or unknown frame to report the bad frame.

Thus, to allocate bandwidth in conventional WLANs, the stations must contend with substantial processing overhead to compete for available bandwidth when there is no central control (e.g., in DCF mode), or must make requests for bandwidth to the AP and wait for the allocation via polling (e.g., in PCF mode). Consequently, both the DCF and PCF modes reduce throughput, especially in upstream traffic, due to the overhead involved with allocating bandwidth amongst the stations.

SUMMARY OF THE INVENTION

A system and method are disclosed for allocating bandwidth in a network. In accordance with exemplary embodiments of the present invention, according to a first aspect of the present invention, a base station for allocating bandwidth in a network includes a transceiver and a bandwidth allocation engine. During a measurement period, the bandwidth allocation engine is configured to monitor an amount of information transmitted by stations in the network to determine bandwidth required by each of the stations. After the measurement period, the transceiver is configured to transmit a bandwidth allocation message from the bandwidth allocation engine to the stations allocating bandwidth to each of the stations for transmitting information during respective timeslots specified in the bandwidth allocation message.

According to the first aspect, the base station can comprise an access point. During the measurement period, the stations can communicate information using a predetermined communication protocol. The predetermined communication protocol can comprise carrier sense multiple access with collision avoidance (CSMA/CA). The bandwidth allocation message can comprise a traffic indication map and a bandwidth assignment table. The bandwidth allocation message can comprise a header configured to indicate at least a type of message. For example, the header can comprise an I.E.E.E. 802.11 medium access control (MAC) header. The header can include a retry flag configured to indicate retransmission of information. The header can include a more flag configured to indicate that a station has additional information to transmit. The station can transmit a null information packet to the base station with the more flag set, when the amount of information to be communicated by the station exceeds the timeslots allocated to the station. The bandwidth allocation message can comprise a checksum. The traffic indication map can be configured to identify stations allocated at least one timeslot. The bandwidth assignment table can comprise an identification portion and a timeslot allocation portion for each station allocated at least one timeslot. The identification portion can be configured to identify a station allocated at least one timeslot. The timeslot allocation portion can be configured to contain a number of timeslots allocated to a station.

According to the first aspect, stations allocated at least one timeslot in the bandwidth allocation message can transmit information in an order specified in the bandwidth assignment table. A station can enter a power-save mode for a predetermined length of time, when no timeslots are allocated to the station in the bandwidth allocation message. A station can transmit a null information packet to other stations to indicate an end of transmission by the station, when the amount of information communicated by the station is less than the timeslots allocated to the station. The network can comprise, for example, a wireless local area network. The base station can be compatible with a standard selected from the group consisting of I.E.E.E. 802.11, 802.11a, 802.11b, 802.11g, 802.11n, 802.16 and 802.20, or any suitable wireless or wired standard. According to an exemplary embodiment of the first aspect, a semiconductor device can comprise the base station.

According to a second aspect of the present invention, a station for allocating bandwidth in a network includes a transceiver and a configuration engine. During a measurement period, the transceiver is configured to transmit information using a predetermined communication protocol. After the measurement period, the configuration engine is configured to receive a bandwidth allocation message allocating bandwidth for transmitting information during respective timeslots specified in the bandwidth allocation message. Allocation of timeslots in the bandwidth allocation message is based on an amount of information transmitted during the measurement period.

According to the second aspect, the predetermined communication protocol can comprise CSMA/CA. The bandwidth allocation message can comprise a traffic indication map and a bandwidth assignment table. The bandwidth allocation message can comprise a header configured to indicate at least a type of message. For example, the header can comprise an I.E.E.E. 802.11 MAC header. The header can include a retry flag configured to indicate retransmission of information. The header can include a more flag configured to indicate that the station has additional information to transmit. The station can transmit a null information packet with the more flag set, when the amount of information to be communicated by the station exceeds the timeslots allocated to the station. The bandwidth allocation message can comprise a checksum. The traffic indication map can be configured to identify stations allocated at least one timeslot. The bandwidth assignment table can comprise an identification portion and a timeslot allocation portion for each station allocated at least one timeslot. The identification portion can be configured to identify a station allocated at least one timeslot. The timeslot allocation portion can be configured to contain a number of timeslots allocated to a station.

According to the second aspect, stations allocated at least one timeslot in the bandwidth allocation message can transmit information in an order specified in the bandwidth assignment table. The station can enter a power-save mode for a predetermined length of time, when no timeslots are allocated to the station in the bandwidth allocation message. The station can transmit a null information packet to other stations to indicate an end of transmission by the station, when the amount of information communicated by the station is less than the timeslots allocated to the station. The network can comprise, for example, a wireless local area network. The station can be compatible with a standard selected from the group consisting of I.E.E.E. 802.11, 802.11a, 802.11b, 802.11g, 802.11n, 802.16 and 802.20, or any suitable wireless or wired standard. According to an exemplary embodiment of the second aspect, a semiconductor device can comprise the station.

According to a third aspect of the present invention, a system for allocating bandwidth in a network includes a base station and a plurality of stations in communication with the base station. During a measurement period, the base station monitors an amount of information communicated by each of the plurality of stations to determine bandwidth required by each of the plurality of stations. After the measurement period, the base station transmits a bandwidth allocation message to the plurality of stations allocating bandwidth to each of the plurality of stations for transmitting information during respective timeslots specified in the bandwidth allocation message. The base station can comprise, for example, an access point. The network can comprise a wireless local area network. The system can be compatible with a standard selected from the group consisting of I.E.E.E. 802.11, 802.11a, 802.11b, 802.11g, 802.11n, 802.16 and 802.20, or any suitable wireless or wired standard.

According to a fourth aspect of the present invention, a bandwidth allocation message data structure for allocating bandwidth in a network includes a header data structure. The bandwidth allocation message data structure includes a traffic indication map data structure. The traffic indication map data structure is configured to identify stations in the network allocated at least one timeslot for transmitting information. The bandwidth allocation message data structure includes a bandwidth assignment table data structure. The bandwidth assignment table data structure is configured to specify a number of timeslots allocated to each station.

According to the fourth aspect, the header data structure can comprise an I.E.E.E. 802.11 MAC header data structure. The header data structure can be configured to indicate at least a type of message. The header data structure can include a retry flag configured to indicate retransmission of information. The header data structure can include a more flag configured to indicate that a station has additional information to transmit. The bandwidth allocation message data structure can include a checksum data structure. The bandwidth assignment table data structure can comprise an identification data structure and a timeslot allocation data structure for each station allocated at least one timeslot. The identification data structure of the bandwidth assignment table data structure can be configured to identify a station allocated at least one timeslot. The timeslot allocation data structure can be configured to contain a number of timeslots allocated to a station. According to an exemplary embodiment of the fourth aspect, the bandwidth allocation message data structure can be compatible with a standard selected from the group consisting of I.E.E.E. 802.11, 802.11a, 802.11b, 802.11g, 802.11n, 802.16 and 802.20, or any suitable wireless or wired standard.

According to a fifth aspect of the present invention, a method of allocating bandwidth in a network includes the steps of: a.) establishing a measurement period; b.) monitoring an amount of information communicated in the network during the measurement period; c.) determining bandwidth required for communicating information in the network; and d.) transmitting a bandwidth allocation message, after the measurement period, allocating bandwidth for transmitting information during respective timeslots specified in the bandwidth allocation message.

According to the fifth aspect, during the measurement period, the information can be communicated using a predetermined communication protocol. For example, the predetermined communication protocol can comprise CSMA/CA. The bandwidth allocation message can comprise a traffic indication map and a bandwidth assignment table. The bandwidth allocation message can comprise a header configured to indicate at least a type of message. For example, the header can comprise an I.E.E.E. 802.11 MAC header. The header can include a retry flag configured to indicate retransmission of information. The header can include a more flag configured to indicate that additional information is to be transmitted. The bandwidth allocation message can also comprise a checksum. The traffic indication map can be configured to identify stations allocated at least one timeslot. The bandwidth assignment table can comprise at least one timeslot allocation pair. The at least one timeslot allocation pair can comprise an identification portion and a timeslot allocation portion. The identification portion can be configured to identify a station allocated at least one timeslot. The timeslot allocation portion can be configured to contain a number of timeslots allocated for transmitting information. Information can be communicated in an order specified in the bandwidth assignment table. The network can comprise a wireless local area network. The method can be compatible with a standard selected from the group consisting of I.E.E.E. 802.11, 802.11a, 802.11b, 802.11g, 802.11n, 802.16 and 802.20, or any suitable wireless or wired standard.

According to a sixth aspect, a method of allocating bandwidth in a network includes the steps of: a.) transmitting information during a measurement period; and b.) receiving a bandwidth allocation message, after the measurement period, allocating bandwidth for transmitting information during respective timeslots specified in the bandwidth allocation message. Allocation of timeslots in the bandwidth allocation message is based on an amount of information transmitted during the measurement period.

According to the sixth aspect, during the measurement period, the information can be communicated using a predetermined communication protocol. For example, the predetermined communication protocol can comprise CSMA/CA. The bandwidth allocation message can comprise a traffic indication map and a bandwidth assignment table. The bandwidth allocation message can comprise a header configured to indicate at least a type of message. For example, the header can comprise an I.E.E.E. 802.11 MAC header. The header can include a retry flag configured to indicate retransmission of information. The header can include a more flag configured to indicate that additional information is to be transmitted. The method can include the step of: c.) transmitting a null information packet with the more flag set, when the amount of information to be communicated exceeds allocated timeslots. The bandwidth allocation message can comprise a checksum. The traffic indication map can be configured to identify stations allocated at least one timeslot. The bandwidth assignment table can comprise at least one timeslot allocation pair. The at least one timeslot allocation pair can comprise an identification portion and a timeslot allocation portion. The identification portion can be configured to identify a station allocated at least one timeslot. The timeslot allocation portion can be configured to contain a number of timeslots allocated for transmitting information.

According to the sixth aspect, information can be communicated in an order specified in the bandwidth assignment table. The method can include the steps of: d.) entering a power-save mode for a predetermined length of time, when no timeslots are allocated in the bandwidth allocation message; and e.) transmitting a null information packet to indicate an end of transmission, when the amount of information communicated is less than the timeslots allocated. The network can comprise a wireless local area network. The method can be compatible with a standard selected from the group consisting of I.E.E.E. 802.11, 802.11a, 802.11b, 802.11g, 802.11n, 802.16 and 802.20, or any suitable wireless or wired standard.

According to a seventh aspect of the present invention, a method of allocating bandwidth in a network includes the steps of: a.) establishing a measurement period; b.) transmitting information during the measurement period; c.) monitoring an amount of information transmitted in the network during the measurement period; d.) determining bandwidth required for transmitting information in the network based on an amount of information transmitted during the measurement period; and e.) transmitting a bandwidth allocation message, after the measurement period, allocating bandwidth for transmitting information during respective timeslots specified in the bandwidth allocation message. According to an exemplary embodiment of the seventh aspect, the method can be compatible with a standard selected from the group consisting of I.E.E.E. 802.11, 802.11a, 802.11b, 802.11g, 802.11n, 802.16 and 802.20, or any suitable wireless or wired standard.

According to an eighth aspect of the present invention, an apparatus for allocating bandwidth in a network includes transceiver means for communicating information and an allocation means for allocating bandwidth. During a measurement period, the allocation means is configured to monitor an amount of information transmitted by communication means in the network to determine bandwidth required by each of the communication means. After the measurement period, the transceiver means is configured to transmit a bandwidth allocation message from the allocation means to the communication means allocating bandwidth to each of the communication means for transmitting information during respective timeslots specified in the bandwidth allocation message.

According to the eighth aspect, the apparatus can comprise an access point. During the measurement period, the communication means can communicate information using a predetermined communication protocol. For example, the predetermined communication protocol can comprise CSMA/CA. The bandwidth allocation message can comprise a traffic indication map and a bandwidth assignment table. The bandwidth allocation message can comprise a header configured to indicate at least a type of message. For example, the header can comprise an I.E.E.E. 802.11 MAC header. The header can include a retry flag configured to indicate retransmission of information. The header can include a more flag configured to indicate that a communication means has additional information to transmit. The communication means can transmit a null information packet to the apparatus with the more flag set, when the amount of information to be communicated by the communication means exceeds the timeslots allocated to the communication means. The bandwidth allocation message can also comprise a checksum. The traffic indication map can be configured to identify communication means allocated at least one timeslot. The bandwidth assignment table can comprise an identification portion and a timeslot allocation portion for each communication means allocated at least one timeslot. The identification portion can be configured to identify a communication means allocated at least one timeslot. The timeslot allocation portion can be configured to contain a number of timeslots allocated to a communication means.

According to the eighth aspect, communication means allocated at least one timeslot in the bandwidth allocation message can transmit information in an order specified in the bandwidth assignment table. A communication means can enter a power-save mode for a predetermined length of time, when no timeslots are allocated to the communication means in the bandwidth allocation message. A communication means n transmit a null information packet to other communication means to indicate an end of transmission by the communication means, when the amount of information communicated by the communication means is less than the timeslots allocated to the communication means. The network can comprise a wireless local area network. The apparatus can be compatible with a standard selected from the group consisting of I.E.E.E. 802.11, 802.11a, 802.11b, 802.11g, 802.11n, 802.16 and 802.20, or any suitable wireless or wired standard. According to an exemplary embodiment of the eighth aspect, a semiconductor device can comprise the apparatus.

According to a ninth aspect, an apparatus for allocating bandwidth in a network includes transceiver means for communicating information and a configuration means for configuring information transmission. During a measurement period, the transceiver means is configured to transmit information using a predetermined communication protocol. After the measurement period, the configuration means is configured to receive a bandwidth allocation message allocating bandwidth for transmitting information during respective timeslots specified in the bandwidth allocation message. Allocation of timeslots in the bandwidth allocation message is based on an amount of information transmitted during the measurement period.

According to the ninth aspect, the predetermined communication protocol can comprise CSMA/CA. The bandwidth allocation message can comprise a traffic indication map and a bandwidth assignment table. The bandwidth allocation message can comprise a header configured to indicate at least a type of message. For example, the header can comprise an I.E.E.E. 802.11 MAC header. The header can include a retry flag configured to indicate retransmission of information. The header can include a more flag configured to indicate that the apparatus has additional information to transmit. The apparatus can transmit a null information packet with the more flag set, when the amount of information to be communicated by the apparatus exceeds the timeslots allocated to the station. The bandwidth allocation message can comprise a checksum. The traffic indication map can be configured to identify apparatuses allocated at least one timeslot. The bandwidth assignment table can comprise an identification portion and a timeslot allocation portion for each apparatus allocated at least one timeslot. The identification portion can be configured to identify an apparatus allocated at least one timeslot. The timeslot allocation portion can be configured to contain a number of timeslots allocated to an apparatus.

According to the ninth aspect, apparatuses allocated at least one timeslot in the bandwidth allocation message can transmit information in an order specified in the bandwidth assignment table. The apparatus can enter a power-save mode for a predetermined length of time, when no timeslots are allocated to the apparatus in the bandwidth allocation message. The apparatus can transmit a null information packet to other apparatuses to indicate an end of transmission by the apparatus, when the amount of information communicated by the apparatus is less than the timeslots allocated to the apparatus. The network can comprise a wireless local area network. The apparatus can be compatible with a standard selected from the group consisting of I.E.E.E. 802.11, 802.11a, 802.11b, 802.11g, 802.11n, 802.16 and 802.20. According to an exemplary embodiment of the ninth aspect, a semiconductor device can comprise the apparatus.

According to a tenth aspect of the present invention, a system for allocating bandwidth in a network includes monitoring means for monitoring the network, and a plurality of means for communicating information in communication with the monitoring means. During a measurement period, the monitoring means monitors an amount of information communicated by each of the plurality of communicating means to determine bandwidth required by each of the plurality of communicating means. After the measurement period, the monitoring means transmits a bandwidth allocation message to the plurality of communicating means allocating bandwidth to each of the plurality of communicating means for transmitting information during respective timeslots specified in the bandwidth allocation message. The monitoring means can comprise an access point. The network can comprise a wireless local area network. The system can be compatible with a standard selected from the group consisting of I.E.E.E. 802.11, 802.11a, 802.11b, 802.11g, 802.11n, 802.16 and 802.20, or any suitable wireless or wired standard.

According to an eleventh aspect of the present invention, a system for allocating bandwidth in a wireless network, includes a base station, and a plurality of stations in communication with the base station. During a measurement period, the base station monitors an amount of information packets communicated by each of the plurality of stations to determine bandwidth required by each of the plurality of stations. During the measurement period, the plurality of stations communicate information packets using CSMA/CA. After the measurement period, the base station transmits a bandwidth allocation message to the plurality of stations allocating bandwidth to each of the plurality of stations for transmitting information packets during respective timeslots specified in the bandwidth allocation message. The bandwidth allocation message comprises a header, a traffic indication map, a bandwidth assignment table and a checksum. The traffic indication map is configured to identify stations of the plurality of stations for which at least one timeslot has been allocated for transmitting information packets. The bandwidth assignment table comprises an identification portion and a timeslot allocation portion for each of the plurality of stations for which at least one timeslot has been allocated for transmitting information packets. The identification portion of the bandwidth assignment table is configured to identify a station for which the at least one timeslot has been allocated. The timeslot allocation portion of the bandwidth assignment table is configured to contain a number of timeslots allocated to a station for transmitting information packets. According to an exemplary embodiment of the eleventh aspect, the system can be compatible with a standard selected from the group consisting of I.E.E.E. 802.11, 802.11a, 802.11b, 802.11g, 802.11n, 802.16 and 802.20, or any suitable wireless or wired standard.

According to a twelfth aspect of the present invention, a method of allocating bandwidth in a wireless network includes the steps of: a.) establishing a measurement period; b.) transmitting information packets during the measurement period; c.) monitoring an amount of information packets communicated in the wireless network during the measurement period; d.) determining bandwidth required for communicating information packets in the wireless network based on an amount of information packets transmitted during the measurement period; e.) transmitting a bandwidth allocation message, after the measurement period, allocating bandwidth for transmitting information packets during respective timeslots specified in the bandwidth allocation message; f.) entering a power-save mode for a predetermined length of time, when no timeslots are allocated in the bandwidth allocation message; and g.) transmitting a null information packet to indicate an end of transmission, when the amount of information packets communicated is less than timeslots allocated. According to an exemplary embodiment of the twelfth aspect, the method can be compatible with a standard selected from the group consisting of I.E.E.E. 802.11, 802.11a, 802.11b, 802.11g, 802.11n, 802.16 and 802.20, or any suitable wireless or wired standard.

According to a thirteenth aspect of the present invention, a system for allocating bandwidth in a wireless network includes monitoring means for monitoring the network, and a plurality of means for communicating in communication with the monitoring means. During a measurement period, the monitoring means monitors an amount of information packets communicated by each of the plurality of communicating means to determine bandwidth required by each of the plurality of communicating means. During the measurement period, the plurality of communicating means communicate information packets using CSMA/CA. After the measurement period, the monitoring means transmits a bandwidth allocation message to the plurality of communicating means allocating bandwidth to each of the plurality of communicating means for transmitting information packets during respective timeslots specified in the bandwidth allocation message. The bandwidth allocation message comprises a header, a traffic indication map, a bandwidth assignment table and a checksum. The traffic indication map is configured to identify communicating means for which at least one timeslot has been allocated for transmitting information packets. The bandwidth assignment table comprises an identification portion and a timeslot allocation portion for each of the plurality of communicating means for which at least one timeslot has been allocated for transmitting information packets. The identification portion of the bandwidth assignment table is configured to identify a communicating means for which the at least one timeslot has been allocated. The timeslot allocation portion of the bandwidth assignment table is configured to contain a number of timeslots allocated to a communicating means for transmitting information packets. According to an exemplary embodiment of the thirteenth aspect, the system can be compatible with a standard selected from the group consisting of I.E.E.E. 802.11, 802.11a, 802.11b, 802.11g, 802.11n, 802.16 and 802.20, or any suitable wireless or wired standard.

According to a fourteenth aspect of the present invention, a computer program for allocating bandwidth in a network performs the steps of: a.) establishing a measurement period; b.) receiving an indication of an amount of information communicated in the network during the measurement period; c.) determining bandwidth required for communicating information in the network; and d.) generating a bandwidth allocation message, after the measurement period, allocating bandwidth for transmitting information during respective timeslots specified in the bandwidth allocation message.

According to the fourteenth aspect, during the measurement period, the information can be communicated using a predetermined communication protocol, such as, for example, CSMA/CA or the like. The bandwidth allocation message can comprise a traffic indication map and a bandwidth assignment table. The bandwidth allocation message can comprise a header configured to indicate at least a type of message. For example, the header can comprise an I.E.E.E. 802.11 MAC header or the like. The header can include a retry flag configured to indicate retransmission of information. The header can include a more flag configured to indicate that additional information is to be transmitted. The bandwidth allocation message can comprise a checksum. The traffic indication map can be configured to identify stations allocated at least one timeslot.

According to the fourteenth aspect, the bandwidth assignment table can comprise at least one timeslot allocation pair. The at least one timeslot allocation pair can comprise an identification portion and a timeslot allocation portion. The identification portion can be configured to identify a station allocated at least one timeslot. The timeslot allocation portion can be configured to contain a number of timeslots allocated for transmitting information. Information can be communicated in an order specified in the bandwidth assignment table. The network can comprise, for example, a wireless local area network. The steps performed by the computer program can be compatible with a standard selected from the group consisting of I.E.E.E. 802.11, 802.11a, 802.11b, 802.11g, 802.11n, 802.16 and 802.20, or any suitable wireless or wired standard.

According to a fifteenth aspect of the present invention, a computer program for allocating bandwidth in a network performs the steps of: a.) providing information for transmission during a measurement period; and b.) receiving a bandwidth allocation message, after the measurement period, allocating bandwidth for transmitting information during respective timeslots specified in the bandwidth allocation message, wherein allocation of timeslots in the bandwidth allocation message is based on an amount of information transmitted during the measurement period.

According to the fifteenth aspect, during the measurement period, the information can be transmitted using a predetermined communication protocol, such as, for example, CSMA/CA or the like. The bandwidth allocation message can comprise a traffic indication map and a bandwidth assignment table. The bandwidth allocation message can comprise a header configured to indicate at least a type of message. For example, the header can comprise an I.E.E.E. 802.11 MAC header or the like. The header can include a retry flag configured to indicate retransmission of information. The header can include a more flag configured to indicate that additional information is to be transmitted. The computer program can perform the step of: c.) generating a null information packet with the more flag set, when the amount of information to be communicated exceeds allocated timeslots. The bandwidth allocation message can comprise a checksum. The traffic indication map can be configured to identify stations allocated at least one timeslot.

According to the fifteenth aspect, the bandwidth assignment table can comprise at least one timeslot allocation pair. The at least one timeslot allocation pair can comprise an identification portion and a timeslot allocation portion. The identification portion can be configured to identify a station allocated at least one timeslot. The timeslot allocation portion can be configured to contain a number of timeslots allocated for transmitting information. Information can be transmitted in an order specified in the bandwidth assignment table. The computer program can perform the step of: d.) generating a signal to enter a power-save mode for a predetermined length of time, when no timeslots are allocated in the bandwidth allocation message; and e.) generating a null information packet to indicate an end of transmission, when the amount of information communicated is less than the timeslots allocated. The network can comprise, for example, a wireless local area network. The steps performed by the computer program can be compatible with a standard selected from the group consisting of I.E.E.E. 802.11, 802.11a, 802.11b, 802.11g, 802.11n, 802.16 and 802.20, or any suitable wireless or wired standard.

According to a sixteenth aspect of the present invention, a computer program for allocating bandwidth in a network performs the steps of: a.) establishing a measurement period; b.) providing information for transmission during the measurement period; c.) receiving an indication of an amount of information transmitted in the network during the measurement period; d.) determining bandwidth required for transmitting information in the network based on an amount of information transmitted during the measurement period; and e.) generating a bandwidth allocation message, after the measurement period, allocating bandwidth for transmitting information during respective timeslots specified in the bandwidth allocation message. The steps performed by the computer program can be compatible with a standard selected from the group consisting of I.E.E.E. 802.11, 802.11a, 802.11b, 802.11g, 802.11n, 802.16 and 802.20, or any suitable wireless or wired standard.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Exemplary embodiments of the present invention are directed to a system and method for estimating bandwidth requirements of and allocating bandwidth to communication devices operating in a network, referred to herein as "predictive medium access control (MAC)." According to exemplary embodiments, bandwidth demand is calculated for all active stations in a wireless local area network (WLAN) by a base station, such as, for example, an Access Point (AP), and a bandwidth allocation scheme is used to allow stations to transmit data in an orderly fashion. Stations working in the same WLAN do not need to make requests for bandwidth. Instead, the AP establishes measurement periods in which to monitor the bandwidth utilized by each transmitting station. During this measurement period, the stations employ a conventional carrier sense multiple access with collision avoidance (CSMA/CA) scheme for transmitting data. From the data collected during the measurement periods, the AP estimates the bandwidth to be required by each transmitting station. The AP then transmits a traffic allocation frame to all stations at regular intervals. The duration of such intervals satisfies the bandwidth requirements of all stations detected during the measurement period. The traffic allocation frame contains: a bit map to indicate the identification of the stations for which one or more timeslots have been allocated by the AP for transmission; and a bandwidth assignment table indicating the number of timeslots allocated to each station specified in the bit map. Upon receiving the traffic allocation frame, the stations to which timeslots have been allocated use the information contained in the bit map and the bandwidth assignment table to determine their order of transmission.

The number of timeslots assigned by the AP to each station can be adjusted in accordance with the level of traffic from the stations, as determined by the AP during the measurement periods. If a station does not need all of the timeslots allocated to it, the AP can reduce the number of timeslots allocated to the station by, for example, one or more. If a station needs more timeslots than allocated to it, the AP can increase the number of timeslots allocated to the station by, for example, one or more. In addition, if a station has no timeslots allocated to it in a traffic allocation frame, then the station can choose to enter into a sleep or low-power mode for a period equal to the sum of all allocated timeslots. Upon waking up, if the station has information to transmit, the station will wait until after the next traffic allocation frame has arrived and all stations with allocated timeslots complete their transmission, before the station begins transmitting its information during the subsequent measurement period.

Figure 1A:
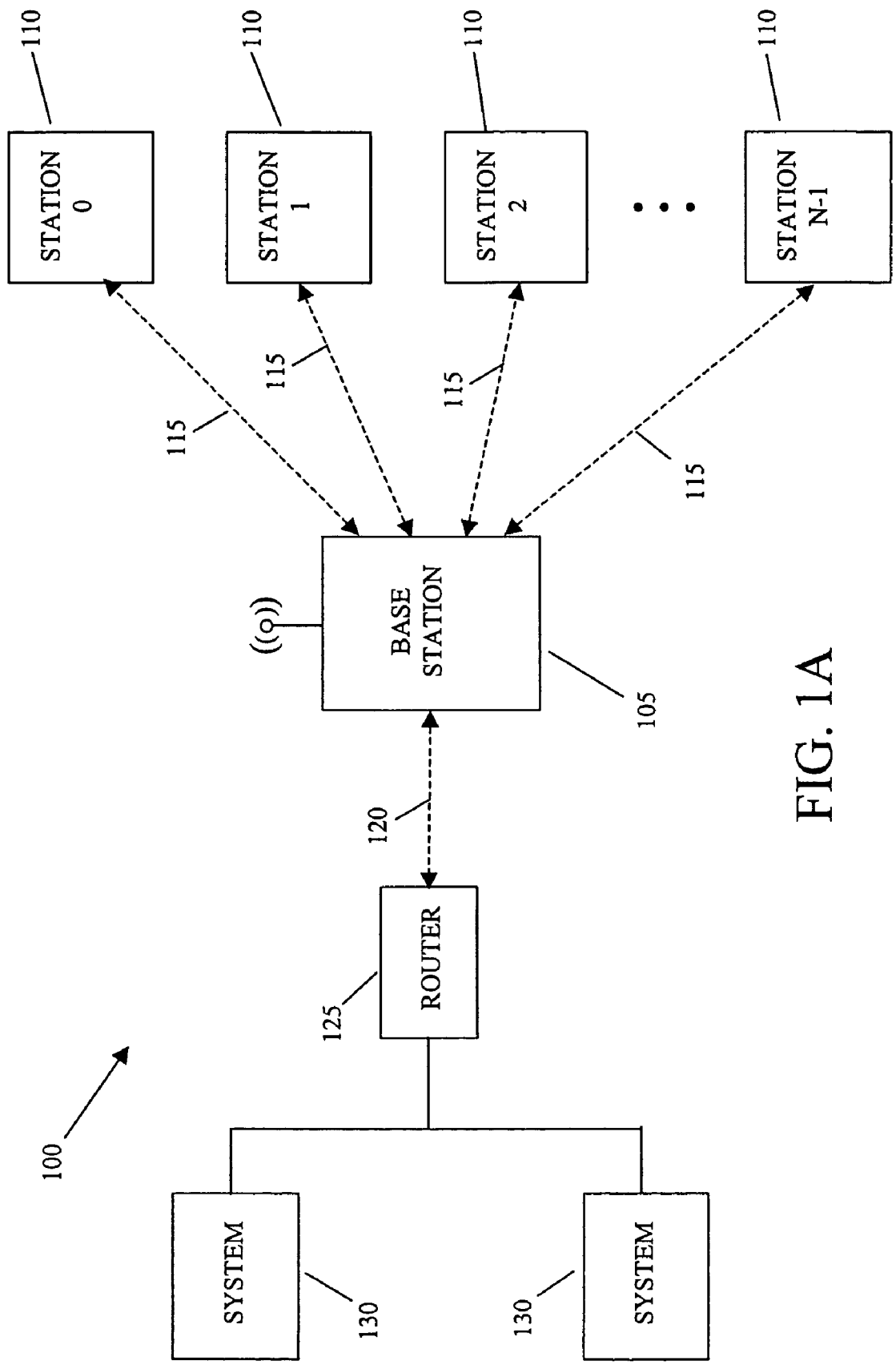
FIGS. 1A, 1B and 1C are diagrams illustrating a system, base station, and station, respectively, for estimating bandwidth requirements of and allocating bandwidth to communication devices operating in a network, in accordance with an exemplary embodiment of the present invention.

These and other aspects of the present invention will now be described in greater detail. FIG. 1A is a diagram illustrating a system 100 for estimating bandwidth requirements of and allocating bandwidth to communication devices operating in a network, in accordance with an exemplary embodiment of the present invention. FIG. 1A can represent, for example, cells of a WLAN or the like, although FIG. 1A can represent any suitable network. The system 100 includes a base station 105. The base station 105 can comprise a network monitor element such as, for example, an AP or other suitable network monitoring device. The system 100 also includes a plurality of clients or stations 110 in communication with the base station 105 over, for example, wireless communication channels 115 or other suitable communication medium. The network 100 can include any number of stations 110 (i.e., Station 0, Station 1, Station 2, ..., Station (N−1)).

According to exemplary embodiments, during a measurement period, the base station 105 monitors an amount of information communicated by each of the plurality of stations 110 to determine bandwidth required by each of the plurality of stations 110. More particularly, the base station 105 establishes one or more measurement periods, each of which being any suitable length of time for monitoring the bandwidth utilized by each of the stations 110. The length of a measurement period can depend on, for example, the amount of information transmitted by the stations 110, and the like. During the measurement period, the plurality of stations 110 communicate information packets using a predetermined communication protocol. For example, the stations 110 can communicate using a CSMA/CA scheme or other suitable communication protocol. From the data collected during the measurement periods, the base station 105 can estimate or otherwise project the bandwidth to be required by each of the stations 110.

Consequently, after each measurement period, the base station 105 transmits a bandwidth allocation message to the plurality of stations 110 allocating bandwidth to each of the plurality of stations 110 for transmitting information during respective timeslots specified in the bandwidth allocation message. The bandwidth allocation messages are transmitted at regular intervals by the base station 105. According to exemplary embodiments, the duration of the intervals and the frequency with which the bandwidth allocation messages are transmitted is designed to satisfy the bandwidth requirements of the plurality of stations 110. For example, the length of time between transmission of bandwidth allocation messages can allow for the stations 110 to transmit using a Distributed Coordinated Function (DCF) mode or the like. Upon receiving the bandwidth allocation message, the stations 110 for which one or more timeslots have been allocated use the information contained in the bandwidth allocation message to determine their respective order of transmission. Thus, according to exemplary embodiments, stations 110 make implicit, rather than explicit, requests for bandwidth, and do not wait for a poll message from the base station 105 to determine how much and in what order the stations 110 are to transmit.

According to exemplary embodiments, the base station 105 can estimate or otherwise project the bandwidth to be required by each of the stations 110 using any suitable method. For purposes of illustration and not limitation, assume that the system 100 includes three stations: Station 0, Station 1 and Station 2. During a measurement period established by the base station 105, Station 0 accesses the Internet intermittently, Station 1 performs numerous file uploads, and Station 2 performs numerous file downloads. From the amount of information transmitted by each station, the base station 105 calculates that Station 0 transmits data at a rate of, for example, 56 KB/sec, while Station 1 transmits data at a rate of, for example, 2 MB/sec. Although Station 2 is receiving large amounts of data, it is only sending TCP ACKs (in response to receiving the data). Consequently, the base station 105 can determine that Station 2 has an effective throughput of 256 KB/sec. Based on this information, the base station 105 can allocate the appropriate number of timeslots to each station for transmitting data during their respective time allocations.

Figure 1B:
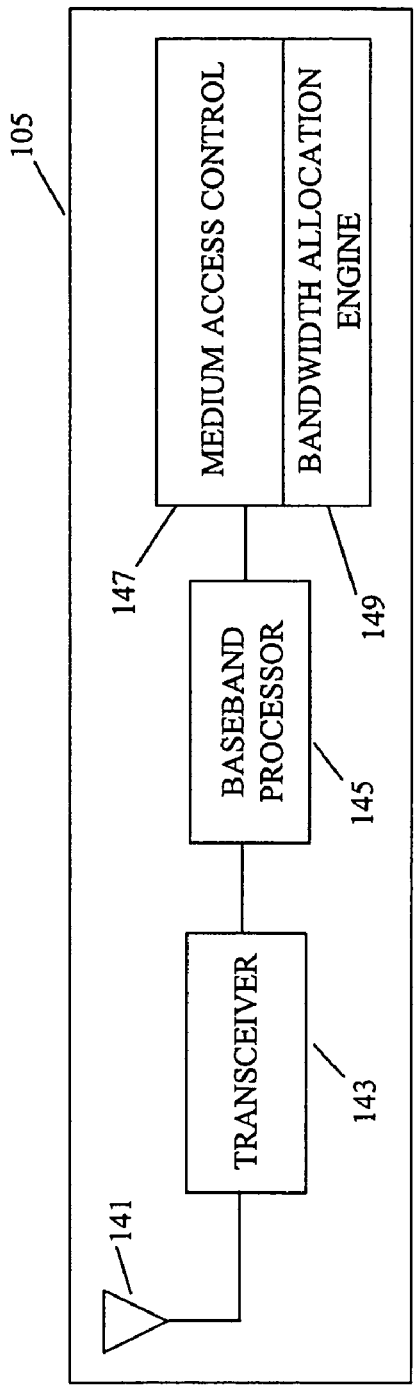
Figure 1C:
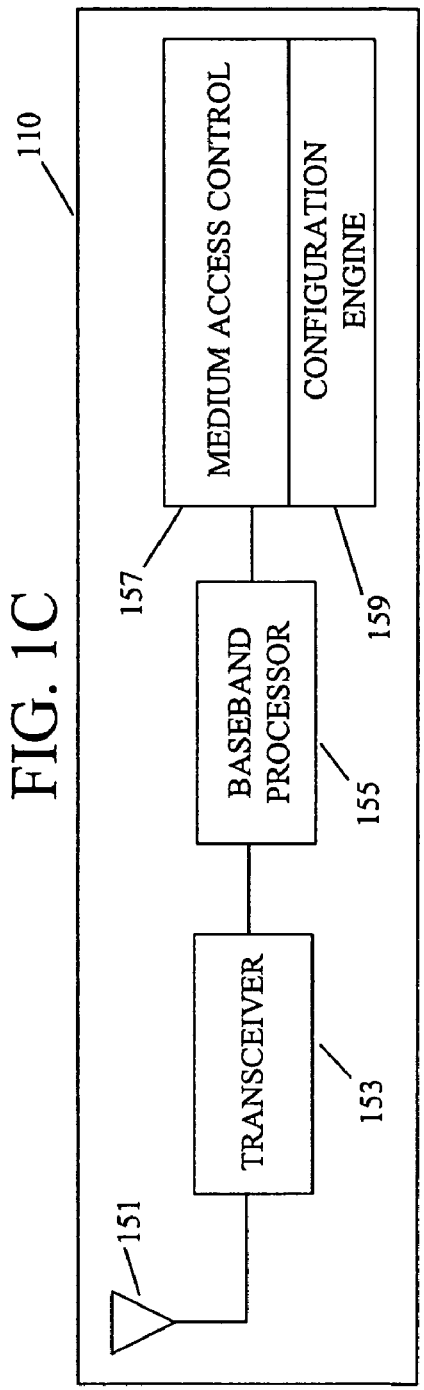

FIGS. 1B and 1C are diagrams illustrating the base station 105 and station 110 for estimating bandwidth requirements of and allocating bandwidth to communication devices operating in a network, in accordance with an exemplary embodiment of the present invention. As illustrated in FIG. 1B, the base station 105 includes a transceiver 143 for communicating information. The base station 105 can include any suitable additional components necessary for transmitting and receiving information, such as, for example, a baseband processor 145 and the like. The base station 105 also includes a medium access control (MAC) layer 147, including a bandwidth allocation engine 149. The bandwidth allocation engine 149 is configured to, for example, monitor the amount of information transmitted by stations 110 in the network during each measurement period to determine the bandwidth required by each of the stations 110. The transceiver 143 is configured to transmit, after the measurement period, the bandwidth allocation message from the bandwidth allocation engine 149 to the stations 110 allocating bandwidth to each of the stations 110 for transmitting information during respective timeslots specified in the bandwidth allocation message. The MAC layer 147 can also include any suitable additional engines for managing or otherwise directing information communication in the network, such as, for example, SSID generator engines, power selector engines, detector engines, verification/authorization engines, and the like. The base station 105 can also include an antenna 141.

As illustrated in FIG. 1C, a station 110 includes a transceiver 153 for communicating information. The station 110 can include any suitable additional components necessary for transmitting and receiving information, such as, for example, a baseband processor 155 and the like. The transceiver 153 is configured to transmit information using a predetermined communication protocol, such as, for example, CSMA/CA or the like, during the measurement period. The station 110 also includes a MAC layer 157, including a configuration engine 159. The configuration engine 159 is configured to receive, after the measurement period, the bandwidth allocation message allocating bandwidth for transmitting information during respective timeslots specified in the bandwidth allocation message. The MAC layer 157 can also include any suitable additional engines for communicating information in the network, such as, for example, SSID generator engines, power selector engines, detector engines, verification/authorization engines, and the like. The station 110 can also include an antenna 151.

Figure 2A:
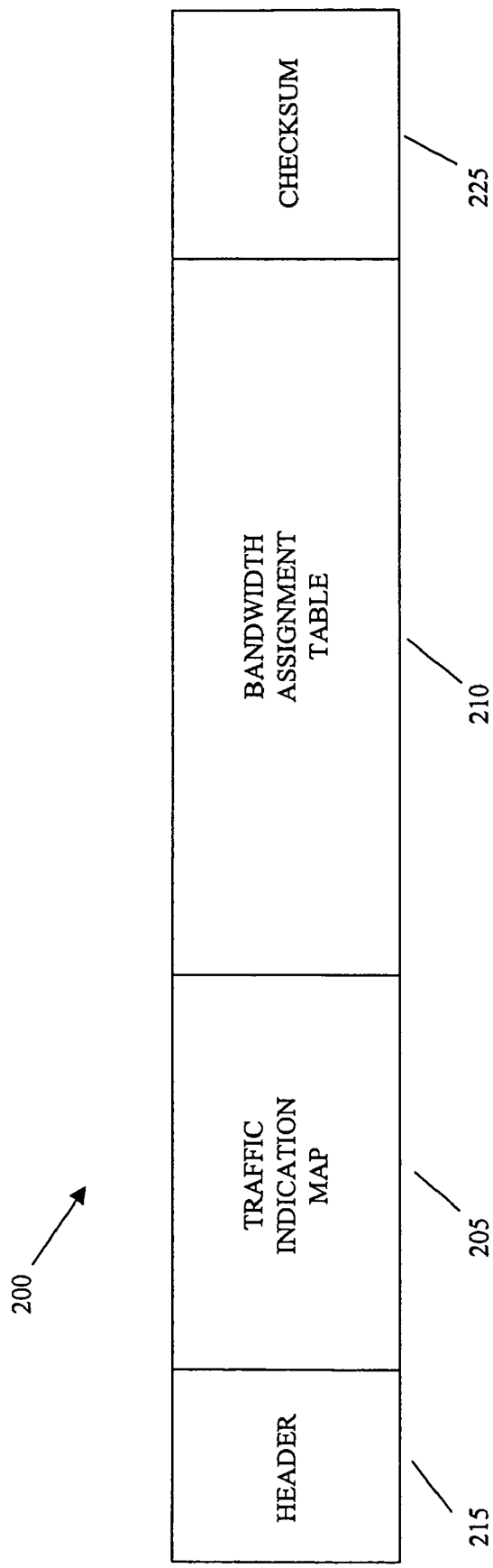
FIGS. 2A and 2B are diagrams illustrating a bandwidth allocation message, in accordance with an exemplary embodiment of the present invention.
Figure 2B:
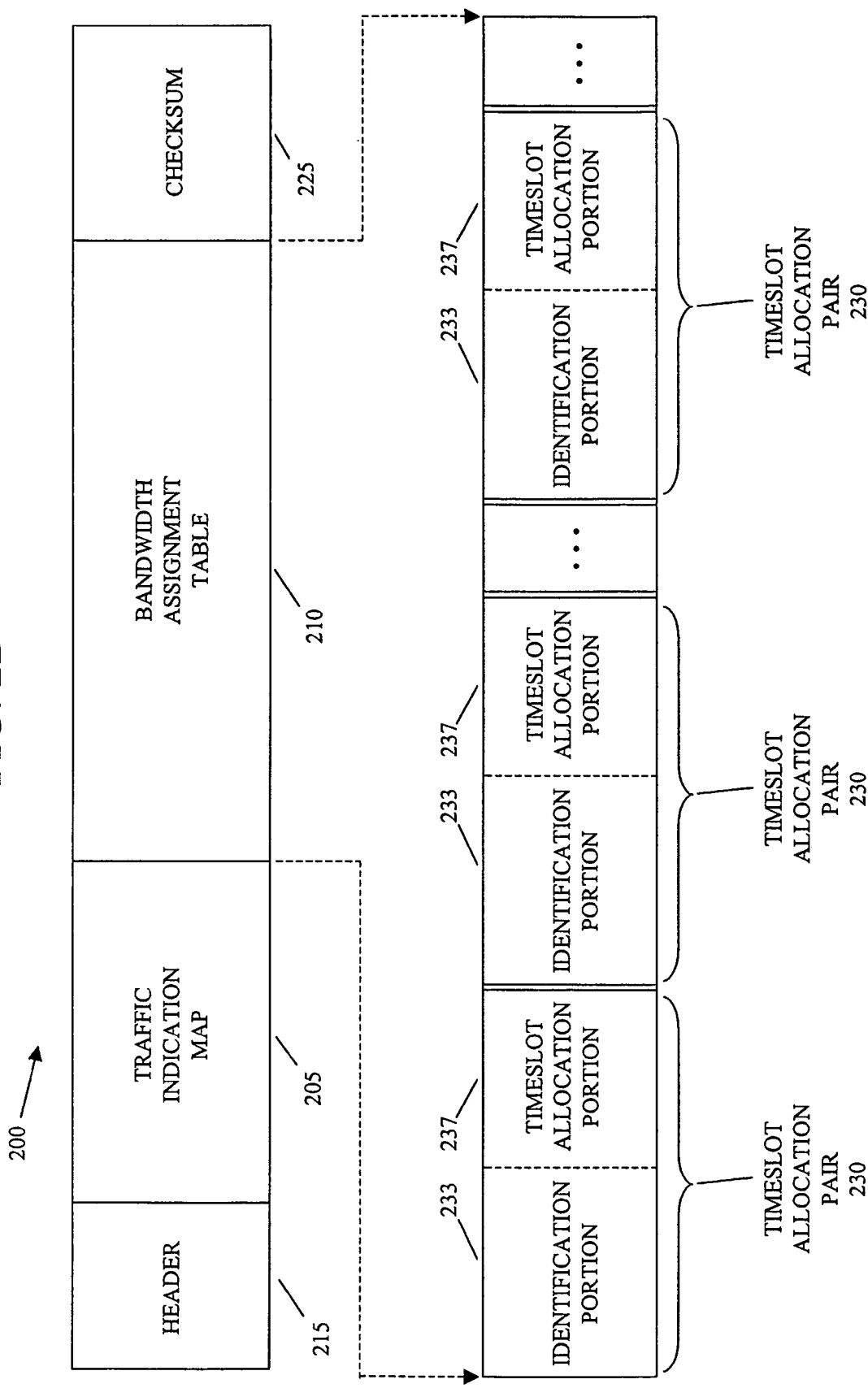

FIGS. 2A and 2B are diagrams illustrating a bandwidth allocation message 200, in accordance with an exemplary embodiment of the present invention. As illustrated in FIG. 2A, the bandwidth allocation message 200 comprises a traffic indication map 205 and a bandwidth assignment table 210. According to exemplary embodiments, the traffic indication map 205 is configured to identify stations 110 of the plurality of stations 110 for which at least one timeslot has been allocated for transmitting information. For example, the traffic indication map 205 can be comprised of a bit map, of any suitable length, in which each bit of the bit map corresponds to one of the plurality of stations 110. For example, bit position zero can correspond to Station 0, bit position one can correspond to Station 1, bit position two can correspond to Station 2, and the like. For each bit position, a zero value represents that the corresponding station 110 has not been allocated any timeslots by the base station 105, while a one value represents that the corresponding station 110 has been allocated one or more timeslots. In one exemplary embodiment, the traffic indication map 205 can be comprised of 256 bits to support up to 256 stations. However, the traffic indication map 205 can be comprised of any suitable number of bits to support up to any appropriate number of stations 110.

Upon receipt of the bandwidth allocation message 200, each station 110 can check its corresponding bit position in the traffic indication map 205 to determine whether one or more timeslots have been allocated to the respective station 110. If the corresponding bit position is set to a one value, the station 110 can then check the bandwidth assignment table 210 to determine how many timeslots have been allocated to the station 110 for transmitting information.

As illustrated in FIG. 2B, according to exemplary embodiments, the bandwidth assignment table 210 comprises a plurality of timeslot allocation pairs 230, one pair for each of the plurality of stations 110 for which at least one timeslot has been allocated for transmitting information. In other words, each station 110 allocated one or more timeslots by the base station 105 (as indicated by a one value in the corresponding bit position of the traffic indication map 205) will have a corresponding timeslot allocation pair 230 in the bandwidth assignment table 210. Each timeslot allocation pair 230 is comprised of an identification portion 233 and a timeslot allocation portion 237. The identification portion 233 is configured to identify a station 110 for which the at least one timeslot has been allocated. The corresponding timeslot allocation portion 237 is configured to contain the number of timeslots allocated to the station 110, identified in the corresponding identification portion 233, for transmitting information.

According to an exemplary embodiment, each timeslot allocation pair 230 can be comprised of, for example, two bytes, where the first byte is used for the identification portion 233 and the second byte is used for the timeslot allocation portion 237. However, each timeslot allocation pair 230 can be of any suitable size.

For purposes of illustration and not limitation, assume that the system 100 includes three stations: Station 0, Station 1 and Station 2. During a measurement period, Stations 0, 1 and 2 are determined to be transmitting information at the respective rates discussed in the previous illustration. In the present illustration, assume that based on the information collected during the measurement period, the base station 105 estimates that Station 0 requires no timeslots, Station 1 requires fifteen timeslots for transmitting data, and Station 2 requires six timeslots. In such a situation, in the traffic indication map 205, base station 105 sets each of bit position 1 (corresponding to Station 1) and bit position 2 (corresponding to Station 2) to a one value, indicating that one or more timeslots have been allocated to each of these stations (bit position 0, corresponding to Station 0, is a zero value, because no timeslots are allocated to Station 0).

Consequently, the first timeslot allocation pair 230 of bandwidth assignment table 210 corresponds to Station 1, with the identification portion 233 of that pair set to one (corresponding to Station 1) and the timeslot allocation portion 237 of that pair set to fifteen (representing the number of timeslots allocated to Station 1). The second timeslot allocation pair 230 corresponds to Station 2, with the identification portion 233 of that pair set to two (corresponding to Station 2) and the timeslot allocation portion 237 of that pair set to six (representing the number of timeslots allocated to Station 2). Note that Station 0 does not have a corresponding timeslot allocation pair 230 in bandwidth assignment table 210, as no timeslots are allocated to Station 0. According to an alternative exemplary embodiment, however, each station 110 can have a corresponding timeslot allocation pair 230 in the bandwidth assignment table 210. In such an alternative exemplary embodiment, if no timeslots are allocated to a particular station 110, then the timeslot allocation portion 237 of the timeslot allocation pair 230 corresponding to that station 110 can be set to zero.

The stations 110 allocated at least one timeslot in the bandwidth allocation message 210 transmit information in the order specified in the bandwidth assignment table 210. Thus, according to exemplary embodiments, the order of transmission of the stations 110 can be prioritized. For example, if a particular station 110 is transmitting high priority traffic, base station 105 can move the timeslot allocation pair 230 corresponding to that station 110 to the beginning of the bandwidth assignment table 210. Consequently, the order of transmission of the stations 110 can be changed or otherwise altered by the base station 105 by rearranging or otherwise reordering the timeslot allocation pairs 230 in the bandwidth assignment table 210 to support the desired transmission order. Thus, exemplary embodiments of the present invention can support quality of service (QoS).

According to exemplary embodiments, the station 110 listed first in the bandwidth assignment table 210 begins transmission a predetermined length of time after it receives the bandwidth allocation message 200. The predetermined length of time can be any suitable length of time to allow the (first) station 110 to switch from a receiving mode to a transmitting mode, and can be on the order of, for example, microseconds (e.g., 10 µsecs) or any appropriate length of time. The station 110 listed second in the bandwidth assignment table 210 can then begin transmitting after the predetermined length of time plus the number of timeslots allocated to the station 110 listed first. The station 110 listed third in the bandwidth assignment table 210 can then begin transmitting after the predetermined length of time plus the number of timeslots allocated to the stations 110 listed first and second, and the like. After the predetermined length of time plus the total number of timeslots allocated to the stations 110 (plus any additional overhead time), the base station 105 can enter another measurement period and determine subsequent bandwidth requirements of each of the stations 110.

The length of a timeslot can be any suitable length of time, for example, on the order of microseconds (e.g., 32 µsecs) or any appropriate length of time. However, the length of the timeslot can be configurable, with the timeslot length depending on, for example, the number of stations 110 in the network, the amount of information transmitted by each of the stations 110, the type of network, and the like.

According to exemplary embodiments, a station 110 of the plurality of stations 110 can enter a power-save or low-power mode for a predetermined length of time, when the station 110 is not allocated at least one timeslot in the bandwidth allocation message 200. Thus, by checking the traffic indication map 205, the station 110 can determine whether or not it has been allocated timeslots. The predetermined length of time can be computed such that the station 110 "wakes up" before transmission from the other stations 110 with allocated timeslots is complete. For example, the station 110 can safely enter such a power-save or low-power mode for a period of time equal to the number of all timeslots allocated to other stations 110 multiplied by the length of a timeslot, minus, for example, an adjustment time (e.g., an early wake-up time so that the station 110 wakes up just prior to the end of the last transmission). Alternatively, the predetermined length of time can be calculated by using at most one timeslot for each station 110 that has been allocated timeslots. Other like methods for computing the predetermined length of time can be used. As discussed below, there could be an early termination of all allocated timeslots. In such a situation, the "sleeping" station 110 may wake up late and may miss the measurement period in which its bandwidth requirements would be determined by the base station 105. However, according to exemplary embodiments, the late-waking station 110 can simply wait for the next measurement period to compete for allocated timeslots.

The bandwidth allocation message 200 includes a header 215. The header 215 is configured to indicate at least a type of message (e.g., a management message). Additionally, the header 215 can include a more flag configured to indicate that a station 110 has additional information to transmit, and can include a retry flag configured to indicate retransmission of information by a station 110.

According to exemplary embodiments, the station 110 transmits a null information packet to the base station 105 with the more flag set, when the amount of information to be communicated by the station 110 exceeds the timeslots allocated to the station 110. A "null information packet" is a bandwidth allocation message 200 with a header and no body (i.e., a traffic indication map 205 and bandwidth assignment table 210 of zero length). For purposes of illustration and not limitation, if the station 110 has been allocated five timeslots, but has seven timeslots worth of information to transmit, the station 110 can request additional timeslots using the more flag. The null information packet with the more flag set can be sent by the station 110 before the end of the timeslots allocated to it, such as, for example, after the fourth timeslot in the present illustration. The base station 105 receives the null information packet from the given station 110 and examines the more flag to determine whether the number of timeslots currently allocated to the station 110 should be increased. If the base station 105 determines that the number of timeslots allocated to the given station 110 should be increased, then the base station 105 will increase the number of timeslots for the given station 110 in the next bandwidth allocation message 200 sent after the next measurement period by, for example, one or more timeslots. According to an alternative exemplary embodiment, the station 110 can set the more flag in the last packet it transmits to the base station 105 to request additional timeslots, rather than in a null information packet.

In addition, if a given station 110 needs to continue transmission until it receives, for example, an acknowledgment, the station 110 can request additional timeslots using the retry flag. The null information packet with the retry flag set can be sent by the given station 110 before the end of the timeslots allocated to it. The base station 105 receives the null information packet from the given station 110 and examines the retry flag to determine whether the number of timeslots currently allocated to the station 110 should be increased. If the base station 105 allocates additional timeslots to the station 110, then, after the next measurement period, the base station 105 can transmit a bandwidth allocation message 200 with the retry flag set (to indicate that additional transmission time has been granted) and the number of allocated timeslots in timeslot allocation portion 233 corresponding to the given station 110 increased to accommodate the additional transmission, such as, for example, by one or more timeslots. In the alternative, if the base station 105 does not allocate additional timeslots to the given station 110, the base station 105 transmits a bandwidth allocation message 200 with the retry flag unset, thereby indicating to the given station 110 that its request for additional timeslots has been denied.

According to exemplary embodiments, a station 110 transmits a null information packet to the plurality to stations 110 to indicate an end of transmission by the station 110, when the amount of information communicated by the station 110 is less than the timeslots allocated to the station 110. Thus, for purposes of illustration and not limitation, if a given station 110 has been allocated five timeslots, but has enough information to fill two timeslots, then the given station 110 can send a null information packet after its second timeslot to the other stations 110 in the network to indicate an end of transmission. Upon receipt of such a null information packet, the other stations 110 can adjust the start of their respective transmission times to begin transmission earlier. In addition, the base station 110 can decrease the number of timeslots allocated to the given station 110 in the next bandwidth allocation message 110 by, for example, one or more timeslots.

The bandwidth allocation message 200 can also include a checksum 225. The checksum 225 can be, for example, a 32-bit cyclic redundancy code (CRC), as specified for I.E.E.E. 802.11 (hereinafter "802.11") frames, or any suitable checksum. The checksum 225 can be calculated over all fields of the header 215, traffic indication map 205, and bandwidth assignment table 210.

According to exemplary embodiments, the system 100 can be compatible with a standard selected from the group consisting of I.E.E.E. 802.11, 802.11a, 802.11b, 802.11g, 802.11n, 802.16 and 802.20, or any other suitable wireless or wired standard. For example, according to one exemplary embodiment of the present invention, for a 802.11 WLAN, the bandwidth allocation message 200 can comprise a 802.11 MAC management frame, with the header 215 comprising a 802.11 MAC header and the traffic indication map 205 and bandwidth assignment table 210 forming the frame body of the 802.11 MAC management frame.

Figure 3:
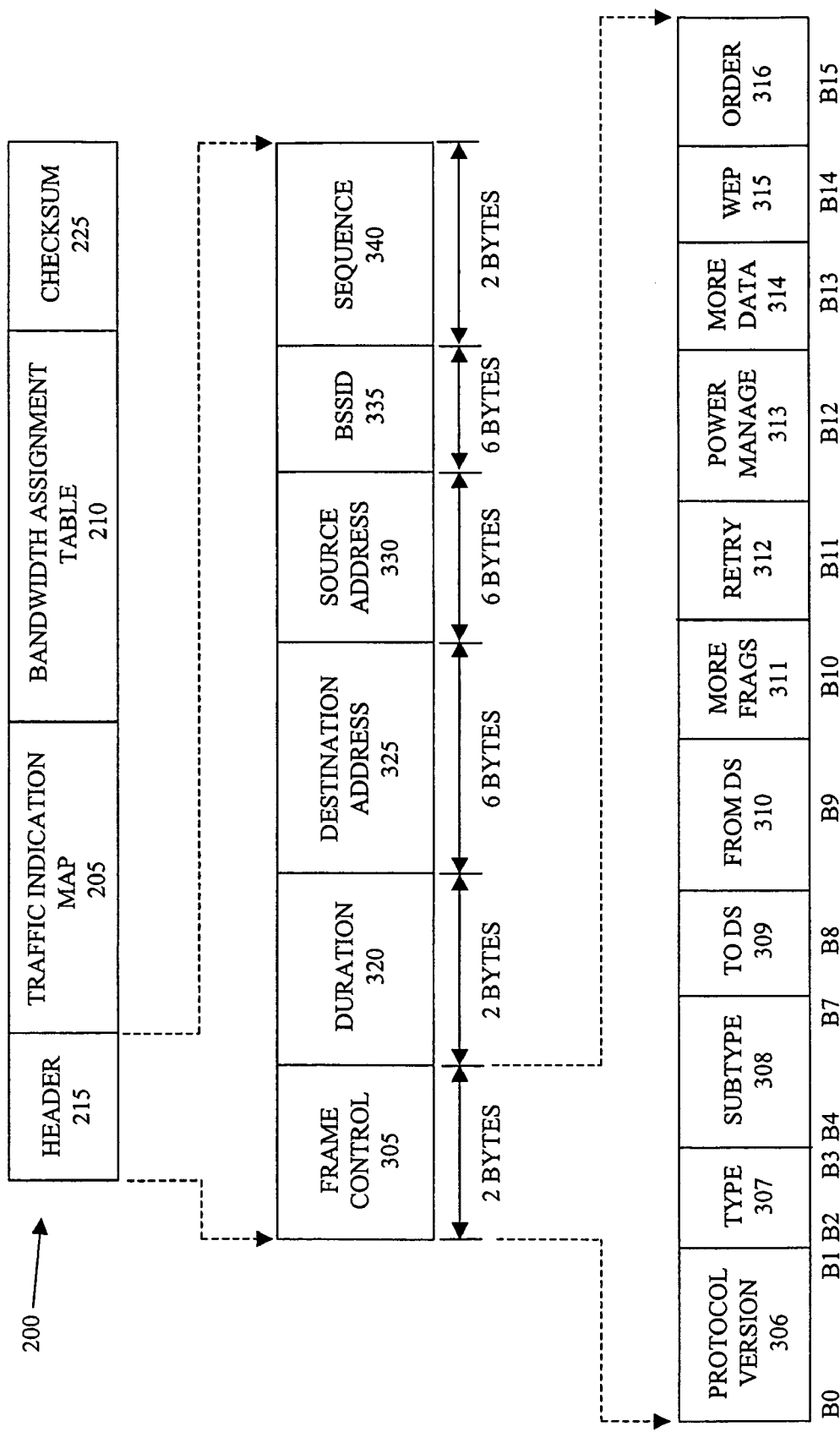
FIG. 3 illustrates a header of a bandwidth allocation message comprising an I.E.E.E. 802.11 medium access control (MAC) management frame, in accordance with an exemplary embodiment of the present invention.

FIG. 3 illustrates the header 215 of the bandwidth allocation message 200 comprising a 802.11 MAC management frame, in accordance with an exemplary embodiment of the present invention. In FIG. 3, the first two bytes of header 215 comprise Frame Control 305. Frame control 305 is comprised of eleven subfields. The first subfield is Protocol Version 306 (two bits), that allows two versions of the protocol to operate at the same time in the same cell. The next subfield is Type 307 (two bits), that specifies whether the frame is either a data, control or management frame. For a management frame, bits B2 and B3 would be 0 and 0. The next subfield is Subtype 308 (four bits), that further defines the data, control or management frame specified in Type 307, as each frame type has several different subtypes. The To DS 309 and From DS 310 (each one bit) indicate that the frame is either going to or coming from the intercell Distribution System (DS). The next subfield is More Fragments 311 (one bit), that indicates that more frame fragments of the current frame are to follow. The next subfield is Retry 312 (one bit), that marks a retransmission of a frame previously sent. According to exemplary embodiments, Retry 312 can be used as the retry flag discussed previously. Power Management 313 (one bit) is used by the AP to put the receiving station into a sleep state or take the station out of sleep state. The next subfield is More Data 314 (one bit), that indicates that the sender has additional frames for the receiver. According to exemplary embodiments, More Data 314 can be used as the more flag by a station 110 to request additional timeslots. The WEP 315 bit specifies that the frame body has been encrypted using the Wired Equivalent Privacy (WEP) algorithm. The final subfield is Order 316 (one bit), that tells the receiver that a sequence of frames with this bit on must be processed strictly in order.

The next two bytes of header 215 can comprise Duration 320, that specifies how long the frame and its acknowledgment will occupy the channel. The next six bytes of header 215 can comprise Destination Address 325, that indicates the address of the destination of the frame. The Source Address 330 (six bytes) indicates the address of the device transmitting the frame. The BSSID 335 (six bytes) uniquely identifies the cell or Basic Service Set (BSS) in which the station or AP is located. Sequence 340 (two bytes) allows frame fragments to be numbered. However, other frame formats for header 215 and bandwidth allocation message 200 are possible, depending on, for example, the type of network (e.g., wireless or wired) in which the bandwidth allocation message 200 is to be used, the type of protocol used for communicating information in that network, and the like.

Additionally, according to exemplary embodiments, the base station 105 and stations 110 can each be compatible with a standard selected from the group consisting of I.E.E.E. 802.11, 802.11a, 802.11b, 802.11g, 802.11n, 802.16 and 802.20, or any suitable wireless or wired standard. Base station 105 and each of the plurality of stations 110 can be comprised of any suitable type of electrical or electronic components or devices that are capable of performing the functions associated with the respective element. According to an alternative exemplary embodiment, the base station 105 and stations 110 can each be comprised of any suitable semiconductor device. In addition, base station 105 can be in communication with other systems 130 (e.g., other cells or other networks) through the intercell DS via a wireless communications channel 120 to a router 125. The router 125 can be in communication with other systems 130 using any suitable form of communications medium for communicating electrical signals throughout the intercell DS.

Figure 4:
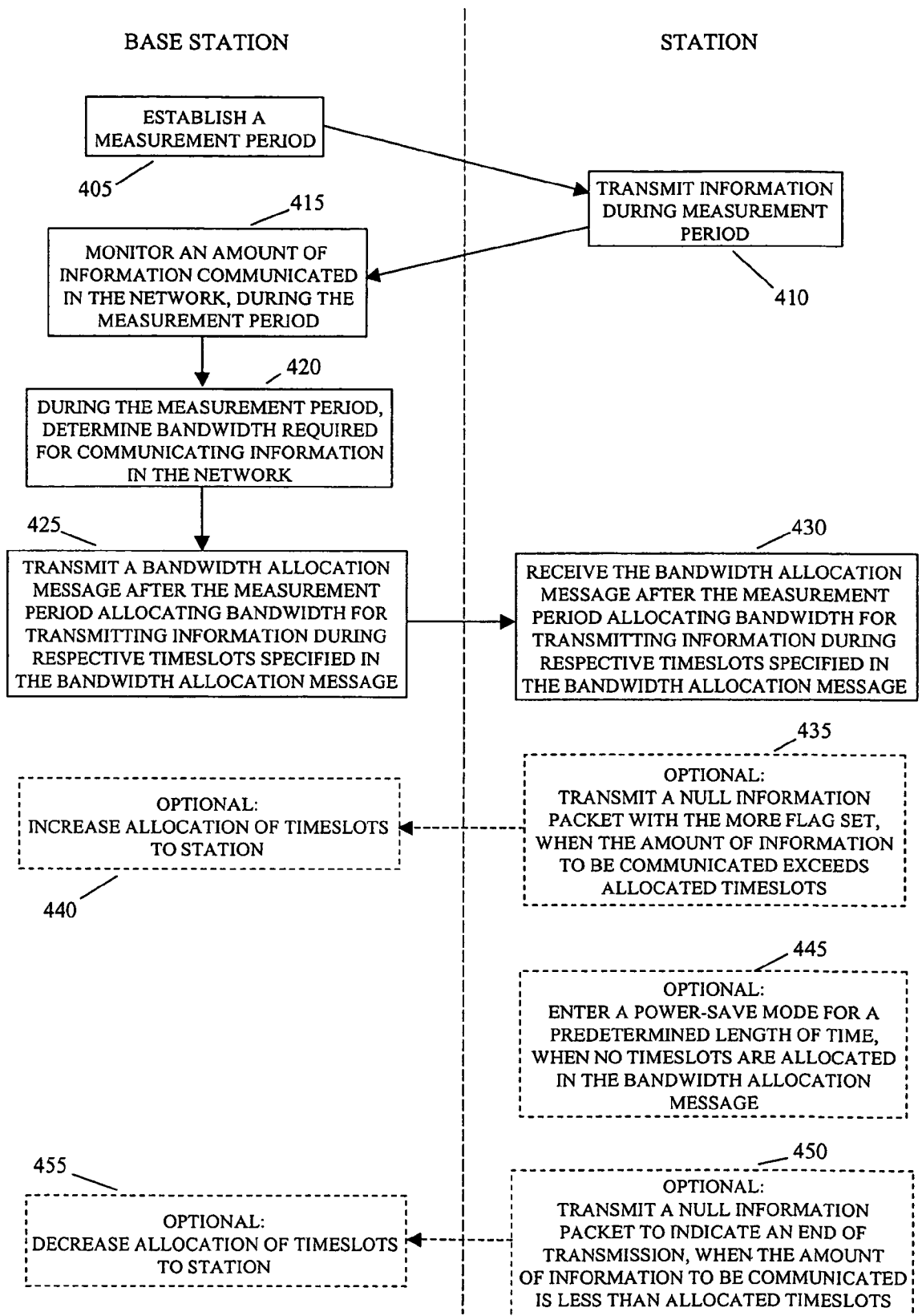
FIG. 4 is a flowchart illustrating steps for allocating bandwidth in a network, in accordance with an exemplary embodiment of the present invention.

FIG. 4 is a flowchart illustrating steps for allocating bandwidth in a network, in accordance with an exemplary embodiment of the present invention. In step 405, a measurement period is established by the base station 105. During the measurement period, in step 410, information is transmitted by the stations 110. The information can be transmitted using a predetermined communication protocol, such as for example, CSMA/CA, or any suitable communication protocol. Also during the measurement period, in step 415, the base station 105 monitors an amount of information communicated in the network by the stations 110. In step 420, the base station 105 determines the bandwidth required by each station 110 for communicating information in the network. After the measurement period, in step 425, a bandwidth allocation message is transmitted allocating bandwidth for transmitting information during respective timeslots specified in the bandwidth allocation message. In step 430, a bandwidth allocation message is received by the stations 110, after the measurement period, allocating bandwidth for transmitting information packets during respective timeslots specified in the bandwidth allocation message. Allocation of timeslots in the bandwidth allocation message is based on an amount of information packets transmitted during the measurement period.

Optionally, in step 435, a null information packet with the more flag set can be transmitted by a station 110 to the base station 105, when the amount of information to be communicated by the station 110 exceeds the number of timeslots allocated to the station 110. Optionally, in step 440, the base station 105 can increase the number of timeslots allocated to the station 110 in the next bandwidth allocation message by, for example, one or more timeslots. Optionally, in step 445, a station 110 can enter a power-save mode for a predetermined length of time, when no timeslots are allocated in the bandwidth allocation message to the given station 110. Optionally, in step 450, a null information packet can be transmitted by a station 110 to indicate an end of transmission by the station 110, when the amount of information packets communicated is less than the timeslots allocated to the station 110. Optionally, in step 455, the base station 105 can decrease the number of timeslots allocated to the station 110 in the next bandwidth allocation by, for example, one or more timeslots.

According to exemplary embodiments, the method illustrated in FIG. 4 can be compatible with a standard selected from the group consisting of I.E.E.E. 802.11, 802.11a, 802.11b, 802.11g, 802.11n, 802.16 and 802.20, or any suitable wireless or wired standard.

Additionally, the steps of a computer program as illustrated in FIG. 4 for allocating bandwidth in a network and the data structure for bandwidth allocation message 200 disclosed herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium can include the following: a portable computer diskette, a random access memory (RAM), a read-only memory (ROM), an erasable programmable read-only memory (EPROM or Flash memory), an optical fiber, or a portable compact disc read-only memory (CDROM).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and applications, foreign patents, and publications discussed above are hereby incorporated herein by reference in their entireties.

What is claimed is:

1. A system for allocating bandwidth in a wireless network, comprising:

a base station; and a plurality of stations in communication with the base station, wherein during a measurement period, the base station monitors an amount of information packets communicated by each of the plurality of stations to determine bandwidth required by each of the plurality of stations, wherein during the measurement period, the plurality of stations communicate information packets using carrier sense multiple access with collision avoidance (CSMA/CA), wherein after the measurement period, the base station transmits a bandwidth allocation message to the plurality of stations allocating bandwidth to each of the plurality of stations for transmitting information packets during respective timeslots specified in the bandwidth allocation message, wherein the bandwidth allocation message comprises a header, a traffic indication map, a bandwidth assignment table and a checksum, wherein the traffic indication map identifies stations of the plurality of stations for which at least one timeslot has been allocated for transmitting information packets, wherein the bandwidth assignment table comprises an identification portion and a timeslot allocation portion for each of the plurality of stations for which at least one timeslot has been allocated for transmitting information packets, wherein the identification portion of the bandwidth assignment table identifies a station for which the at least one timeslot has been allocated, and wherein the timeslot allocation portion of the bandwidth assignment table contains a number of timeslots allocated to a station for transmitting information packets.

2. The system of claim 1, wherein the system is compatible with a standard selected from the group consisting of I.E.E.E. 802.11, 802.11a, 802.11b, 802.11g, 802.11n, 802.16 and 802.20.

3. A method of allocating bandwidth in a wireless network, comprising the steps of:
   a.) establishing a measurement period;
   b.) transmitting information packets during the measurement period;
   c.) monitoring an amount of information packets communicated in the wireless network during the measurement period;
   d.) determining bandwidth required for communicating information packets in the wireless network based on an amount of information packets transmitted during the measurement period;
   e.) transmitting a bandwidth allocation message, after the measurement period, allocating bandwidth for transmitting information packets during respective timeslots specified in the bandwidth allocation message;
   f.) entering a power-save mode for a predetermined length of time, when no timeslots are allocated in the bandwidth allocation message; and
   g.) transmitting a null information packet to indicate an end of transmission, when the amount of information packets communicated is less than timeslots allocated.

4. The method of claim 3, wherein the method is compatible with a standard selected from the group consisting of I.E.E.E. 802.11, 802.11a, 802.11b, 802.11g, 802.11n, 802.16 and 802.20.

5. A system for allocating bandwidth in a wireless network, comprising:
   monitoring means for monitoring the network; and
   a plurality of means for communicating in communication with the monitoring means,
   wherein during a measurement period, the monitoring means monitors an amount of information packets communicated by each of the plurality of communicating means to determine bandwidth required by each of the plurality of communicating means,
   wherein during the measurement period, the plurality of communicating means communicate information packets using carrier sense multiple access with collision avoidance (CSMA/CA),
   wherein after the measurement period, the monitoring means transmits a bandwidth allocation message to the plurality of communicating means allocating bandwidth to each of the plurality of communicating means for transmitting information packets during respective timeslots specified in the bandwidth allocation message,
   wherein the bandwidth allocation message comprises a header, a traffic indication map, a bandwidth assignment table and a checksum,
   wherein the traffic indication map identifies communicating means for which at least one timeslot has been allocated for transmitting information packets,
   wherein the bandwidth assignment table comprises an identification portion and a timeslot allocation portion for each of the plurality of communicating means for which at least one timeslot has been allocated for transmitting information packets,
   wherein the identification portion of the bandwidth assignment table identifies a communicating means for which the at least one timeslot has been allocated, and
   wherein the timeslot allocation portion of the bandwidth assignment table contains a number of timeslots allocated to a communicating means for transmitting information packets.

6. The system of claim 5, wherein the system is compatible with a standard selected from the group consisting of I.E.E.E. 802.11, 802.11a, 802.11b, 802.11g, 802.11n, 802.16 and 802.20.

7. A base station for allocating bandwidth in a network, comprising:
   a transceiver; and
   a bandwidth allocation engine,
   wherein during a measurement period, the bandwidth allocation engine monitors an amount of information transmitted by stations in the network to determine bandwidth required by each of the stations, and
   wherein after the measurement period, the transceiver transmits a bandwidth allocation message from the bandwidth allocation engine to the stations, allocating bandwidth to each of the stations for transmitting information during respective timeslots specified in the bandwidth allocation message.

8. The base station of claim 7, wherein the base station comprises an access point.

9. The base station of claim 7, wherein during the measurement period, the stations communicate information using a predetermined communication protocol.

10. The base station of claim 9, wherein the predetermined communication protocol comprises carrier sense multiple access with collision avoidance (CSMA/CA).

11. The base station of claim 7, wherein the bandwidth allocation message comprises a traffic indication map and a bandwidth assignment table.

12. The base station of claim 11, wherein the bandwidth allocation message comprises a header that indicates at least a type of message.

13. The base station of claim 12, wherein the header comprises an I.E.E.E. 802.11 medium access control (MAC) header.

14. The base station of claim 12, wherein the header includes a retry flag that indicates retransmission of information.

15. The base station of claim 12, wherein the header includes a more flag that indicates that a station has additional information to transmit.

16. The base station of claim 15, wherein the station transmits a null information packet to the base station with the more flag set, when the amount of information to be communicated by the station exceeds the timeslots allocated to the station.

17. The base station of claim 12, wherein the bandwidth allocation message comprises a checksum.

18. The base station of claim 11, wherein the traffic indication map identifies stations allocated at least one timeslot.

19. The base station of claim 11, wherein the bandwidth assignment table comprises an identification portion and a timeslot allocation portion for each station allocated at least one timeslot.

20. The base station of claim 19, wherein the identification portion identifies a station allocated at least one timeslot.

21. The base station of claim 19, wherein the timeslot allocation portion contains a number of timeslots allocated to a station.

22. The base station of claim 11, wherein stations allocated at least one timeslot in the bandwidth allocation message transmit information in an order specified in the bandwidth assignment table.

23. The base station of claim 7, wherein a station enters a power-save mode for a predetermined length of time, when no timeslots are allocated to the station in the bandwidth allocation message.

24. The base station of claim 7, wherein a station transmits a null information packet to other stations to indicate an end of transmission by the station, when the amount of information communicated by the station is less than the timeslots allocated to the station.

25. The base station of claim 7, wherein the network comprises a wireless local area network.

26. The base station of claim 7, wherein the base station is compatible with a standard selected from the group consisting of I.E.E.E. 802.11, 802.11a, 802.11b, 802.11g, 802.11n, 802.16 and 802.20.

27. The base station of claim 7, wherein the base station comprises a semiconductor device.

28. A station for allocating bandwidth in a network, comprising:
a transceiver; and
a configuration engine,
wherein during a measurement period, the transceiver transmits information using a predetermined communication protocol,
wherein after the measurement period, the configuration engine receives a bandwidth allocation message allocating bandwidth for transmitting information during respective timeslots specified in the bandwidth allocation message, and
wherein allocation of timeslots in the bandwidth allocation message is based on an amount of information transmitted during the measurement period.

29. The station of claim 28, wherein the predetermined communication protocol comprises carrier sense multiple access with collision avoidance (CSMA/CA).

30. The station of claim 28, wherein the bandwidth allocation message comprises a traffic indication map and a bandwidth assignment table.

31. The station of claim 30, wherein the bandwidth allocation message comprises a header that indicates at least a type of message.

32. The station of claim 31, wherein the header comprises an I.E.E.E. 802.11 medium access control (MAC) header.

33. The station of claim 31, wherein the header includes a retry flag that indicates retransmission of information.

34. The station of claim 31, wherein the header includes a more flag that indicates that the station has additional information to transmit.

35. The station of claim 34, wherein the station transmits a null information packet with the more flag set, when the amount of information to be communicated by the station exceeds the timeslots allocated to the station.

36. The station of claim 31, wherein the bandwidth allocation message comprises a checksum.

37. The station of claim 30, wherein the traffic indication map identifies stations allocated at least one timeslot.

38. The station of claim 30, wherein the bandwidth assignment table comprises an identification portion and a timeslot allocation portion for each station allocated at least one timeslot.

39. The station of claim 38, wherein the identification portion identifies a station allocated at least one timeslot.

40. The station of claim 38, wherein the timeslot allocation portion contains a number of timeslots allocated to a station.

41. The station of claim 30, wherein stations allocated at least one timeslot in the bandwidth allocation message transmit information in an order specified in the bandwidth assignment table.

42. The station of claim 28, wherein the station enters a power-save mode for a predetermined length of time, when no timeslots are allocated to the station in the bandwidth allocation message.

43. The station of claim 28, wherein the station transmits a null information packet to other stations to indicate an end of transmission by the station, when the amount of information communicated by the station is less than the timeslots allocated to the station.

44. The station of claim 28, wherein the network comprises a wireless local area network.

45. The station of claim 28, wherein the station is compatible with a standard selected from the group consisting of I.E.E.E. 802.11, 802.11a, 802.11b, 802.11g, 802.11n, 802.16 and 802.20.

46. The base station of claim 28, wherein the base station comprises a semiconductor device.

47. A system for allocating bandwidth in a network, comprising:
a base station; and
a plurality of stations in communication with the base station,
wherein during a measurement period, the base station monitors an amount of information communicated by each of the plurality of stations to determine bandwidth required by each of the plurality of stations, and
wherein after the measurement period, the base station transmits a bandwidth allocation message to the plurality of stations allocating bandwidth to each of the plurality of stations for transmitting information during respective timeslots specified in the bandwidth allocation message.

48. The system of claim 47, wherein the base station comprises an access point.

49. The system of claim 47, wherein the network comprises a wireless local area network.

50. The system of claim 47, wherein the system is compatible with a standard selected from the group consisting of I.E.E.E. 802.11, 802.11a, 802.11b, 802.11g, 802.11n, 802.16 and 802.20.

51. A bandwidth allocation message data structure stored on a computer-readable medium and executed by a processor for allocating bandwidth in a network, comprising:
a header data structure;
a traffic indication map data structure,
wherein the traffic indication map data structure identifies stations in the network allocated at least one timeslot for transmitting information; and
a bandwidth assignment table data structure,
wherein the bandwidth assignment table data structure specifies a number of timeslots allocated to each station.

52. The bandwidth allocation message data structure of claim 51, wherein the header data structure comprises an I.E.E.E. 802.11 medium access control (MAC) header data structure.

53. The bandwidth allocation message data structure of claim 51, wherein the header data structure indicates at least a type of message.

54. The bandwidth allocation message data structure of claim 51, wherein the header data structure includes a retry flag that indicates retransmission of information.

55. The bandwidth allocation message data structure of claim 51, wherein the header data structure includes a more flag that indicates that a station has additional information to transmit.

56. The bandwidth allocation message data structure of claim 51, further comprising a checksum data structure.

57. The bandwidth allocation message data structure of claim 51, wherein the bandwidth assignment table data structure comprises an identification data structure and a timeslot allocation data structure for each station allocated at least one timeslot.

58. The bandwidth allocation message data structure of claim 57, wherein the identification data structure of the bandwidth assignment table data structure identifies a station allocated at least one timeslot.

59. The bandwidth allocation message data structure of claim 57, wherein the timeslot allocation data structure contains a number of timeslots allocated to a station.

60. The bandwidth allocation message data structure of claim 51, wherein the bandwidth allocation message data structure is compatible with a standard selected from the group consisting of I.E.E.E. 802.11, 802.11a, 802.11b, 802.11g, 802.11n, 802.16 and 802.20.

61. A method of allocating bandwidth in a network, comprising the steps of:
 a.) establishing a measurement period;
 b.) monitoring an amount of information communicated in the network during the measurement period;
 c.) determining bandwidth required for communicating information in the network; and
 d.) transmitting a bandwidth allocation message, after the measurement period, allocating bandwidth for transmitting information during respective timeslots specified in the bandwidth allocation message.

62. The method of claim 61, wherein during the measurement period, the information is communicated using a predetermined communication protocol.

63. The method of claim 62, wherein the predetermined communication protocol comprises carrier sense multiple access with collision avoidance (CSMA/CA).

64. The method of claim 61, wherein the bandwidth allocation message comprises a traffic indication map and a bandwidth assignment table.

65. The method of claim 64, wherein the bandwidth allocation message comprises a header that indicates at least a type of message.

66. The method of claim 65, wherein the header comprises an I.E.E.E. 802.11 medium access control (MAC) header.

67. The method of claim 65, wherein the header includes a retry flag that indicates retransmission of information.

68. The method of claim 65, wherein the header includes a more flag that indicates that additional information is to be transmitted.

69. The method of claim 65, wherein the bandwidth allocation message comprises a checksum.

70. The method of claim 64, wherein the traffic indication map identifies stations allocated at least one timeslot.

71. The method of claim 64, wherein the bandwidth assignment table comprises at least one timeslot allocation pair, and wherein the at least one timeslot allocation pair comprises an identification portion and a timeslot allocation portion.

72. The method of claim 71, wherein the identification portion identifies a station allocated at least one timeslot.

73. The method of claim 71, wherein the timeslot allocation portion contains a number of timeslots allocated for transmitting information.

74. The method of claim 64, wherein information is communicated in an order specified in the bandwidth assignment table.

75. The method of claim 61, wherein the network comprises a wireless local area network.

76. The method of claim 61, wherein the method is compatible with a standard selected from the group consisting of I.E.E.E. 802.11, 802.11a, 802.11b, 802.11g, 802.11n, 802.16 and 802.20.

77. A method of allocating bandwidth in a network, comprising the steps of:
 a.) transmitting information during a measurement period; and
 b.) receiving a bandwidth allocation message, after the measurement period, allocating bandwidth for transmitting information during respective timeslots specified in the bandwidth allocation message,
 wherein allocation of timeslots in the bandwidth allocation message is based on an amount of information transmitted during the measurement period.

78. The method of claim 77, wherein during the measurement period, the information is transmitted using a predetermined communication protocol.

79. The method of claim 78, wherein the predetermined communication protocol comprises carrier sense multiple access with collision avoidance (CSMA/CA).

80. The method of claim 77, wherein the bandwidth allocation message comprises a traffic indication map and a bandwidth assignment table.

81. The method of claim 80, wherein the bandwidth allocation message comprises a header that indicates at least a type of message.

82. The method of claim 81, wherein the header comprises an I.E.E.E. 802.11 medium access control (MAC) header.

83. The method of claim 81, wherein the header includes a retry flag that indicates retransmission of information.

84. The method of claim 81, wherein the header includes a more flag that indicates that additional information is to be transmitted.

85. The method of claim 84, comprising the step of:
 c.) transmitting a null information packet with the more flag set, when the amount of information to be communicated exceeds allocated timeslots.

86. The method of claim 81, wherein the bandwidth allocation message comprises a checksum.

87. The method of claim 80, wherein the traffic indication map identifies stations allocated at least one timeslot.

88. The method of claim 80, wherein the bandwidth assignment table comprises at least one timeslot allocation pair, and wherein the at least one timeslot allocation pair comprises an identification portion and a timeslot allocation portion.

89. The method of claim 88, wherein the identification portion identifies a station allocated at least one timeslot.

90. The method of claim 88, wherein the timeslot allocation portion contains a number of timeslots allocated for transmitting information.

91. The method of claim 80, wherein information is transmitted in an order specified in the bandwidth assignment table.

92. The method of claim 77, comprising the step of:
c.) entering a power-save mode for a predetermined length of time, when no timeslots are allocated in the bandwidth allocation message.

93. The method of claim 77, comprising the step of:
c.) transmitting a null information packet to indicate an end of transmission, when the amount of information communicated is less than the timeslots allocated.

94. The method of claim 77, wherein the network comprises a wireless local area network.

95. The method of claim 77, wherein the method is compatible with a standard selected from the group consisting of I.E.E.E. 802.11, 802.11a, 802.11b, 802.11g, 802.11n, 802.16 and 802.20.

96. A method of allocating bandwidth in a network, comprising the steps of:
a.) establishing a measurement period;
b.) transmitting information during the measurement period;
c.) monitoring an amount of information transmitted in the network during the measurement period;
d.) determining bandwidth required for transmitting information in the network based on an amount of information transmitted during the measurement period; and
e.) transmitting a bandwidth allocation message, after the measurement period, allocating bandwidth for transmitting information during respective timeslots specified in the bandwidth allocation message.

97. The method of claim 96, wherein the method is compatible with a standard selected from the group consisting of I.E.E.E. 802.11, 802.11a, 802.11b, 802.11g, 802.11n, 802.16 and 802.20.

98. An apparatus for allocating bandwidth in a network, comprising:
transceiver means for communicating information; and
an allocation means for allocating bandwidth,
wherein during a measurement period, the allocation means monitors an amount of information transmitted by communication means in the network to determine bandwidth required by each of the communication means, and
wherein after the measurement period, the transceiver means transmits a bandwidth allocation message from the allocation means to the communication means allocating bandwidth to each of the communication means for transmitting information during respective timeslots specified in the bandwidth allocation message.

99. The apparatus of claim 98, wherein the apparatus comprises an access point.

100. The apparatus of claim 98, wherein during the measurement period, the communication means communicate information using a predetermined communication protocol.

101. The apparatus of claim 100, wherein the predetermined communication protocol comprises carrier sense multiple access with collision avoidance (CSMA/CA).

102. The apparatus of claim 98, wherein the bandwidth allocation message comprises a traffic indication map and a bandwidth assignment table.

103. The apparatus of claim 102, wherein the bandwidth allocation message comprises a header that indicates at least a type of message.

104. The apparatus of claim 103, wherein the header comprises an I.E.E.E. 802.11 medium access control (MAC) header.

105. The apparatus of claim 103, wherein the header includes a retry flag that indicates retransmission of information.

106. The apparatus of claim 103, wherein the header includes a more flag that indicates that a communication means has additional information to transmit.

107. The apparatus of claim 106, wherein the communication means transmits a null information packet to the apparatus with the more flag set, when the amount of information to be communicated by the communication means exceeds the timeslots allocated to the communication means.

108. The apparatus of claim 103, wherein the bandwidth allocation message comprises a checksum.

109. The apparatus of claim 102, wherein the traffic indication map identifies communication means allocated at least one timeslot.

110. The apparatus of claim 102, wherein the bandwidth assignment table comprises an identification portion and a timeslot allocation portion for each communication means allocated at least one timeslot.

111. The apparatus of claim 110, wherein the identification portion identifies a communication means allocated at least one timeslot.

112. The apparatus of claim 110, wherein the timeslot allocation portion contains a number of timeslots allocated to a communication means.

113. The apparatus of claim 102, wherein communication means allocated at least one timeslot in the bandwidth allocation message transmit information in an order specified in the bandwidth assignment table.

114. The apparatus of claim 98, wherein a communication means enters a power-save mode for a predetermined length of time, when no timeslots are allocated to the communication means in the bandwidth allocation message.

115. The apparatus of claim 98, wherein a communication means transmits a null information packet to other communication means to indicate an end of transmission by the communication means, when the amount of information communicated by the communication means is less than the timeslots allocated to the communication means.

116. The apparatus of claim 98, wherein the network comprises a wireless local area network.

117. The apparatus of claim 98, wherein the apparatus is compatible with a standard selected from the group consisting of I.E.E.E. 802.11, 802.11a, 802.11b, 802.11g, 802.11n, 802.16 and 802.20.

118. A semiconductor device comprising the apparatus of claim 98.

119. An apparatus for allocating bandwidth in a network, comprising:
transceiver means for communicating information; and
a configuration means for configuring information transmission,
wherein during a measurement period, the transceiver means transmits information using a predetermined communication protocol,
wherein after the measurement period, the configuration means receives a bandwidth allocation message allocating bandwidth for transmitting information during respective timeslots specified in the bandwidth allocation message, and
wherein allocation of timeslots in the bandwidth allocation message is based on an amount of information transmitted during the measurement period.

120. The apparatus of claim 119, wherein the predetermined communication protocol comprises carrier sense multiple access with collision avoidance (CSMA/CA).

121. The apparatus of claim 119, wherein the bandwidth allocation message comprises a traffic indication map and a bandwidth assignment table.

122. The apparatus of claim 121, wherein the bandwidth allocation message comprises a header that indicates at least a type of message.

123. The apparatus of claim 122, wherein the header comprises an I.E.E.E. 802.11 medium access control (MAC) header.

124. The apparatus of claim 122, wherein the header includes a retry flag that indicates retransmission of information.

125. The apparatus of claim 122, wherein the header includes a more flag that indicates that the apparatus has additional information to transmit.

126. The apparatus of claim 125, wherein the apparatus transmits a null information packet with the more flag set, when the amount of information to be communicated by the apparatus exceeds the timeslots allocated to the apparatus.

127. The apparatus of claim 122, wherein the bandwidth allocation message comprises a checksum.

128. The apparatus of claim 121, wherein the traffic indication map identifies apparatuses allocated at least one timeslot.

129. The apparatus of claim 121, wherein the bandwidth assignment table comprises an identification portion and a timeslot allocation portion for each apparatus allocated at least one timeslot.

130. The apparatus of claim 129, wherein the identification portion identifies an apparatus allocated at least one timeslot.

131. The apparatus of claim 129, wherein the timeslot allocation portion contains a number of timeslots allocated to an apparatus.

132. The apparatus of claim 121, wherein apparatuses allocated at least one timeslot in the bandwidth allocation message transmit information in an order specified in the bandwidth assignment table.

133. The apparatus of claim 119, wherein the apparatus enters a power-save mode for a predetermined length of time, when no timeslots are allocated to the apparatus in the bandwidth allocation message.

134. The apparatus of claim 119, wherein the apparatus transmits a null information packet to other apparatuses to indicate an end of transmission by the apparatus, when the amount of information communicated by the apparatus is less than the timeslots allocated to the apparatus.

135. The apparatus of claim 119, wherein the network comprises a wireless local area network.

136. The apparatus of claim 119, wherein the apparatus is compatible with a standard selected from the group consisting of I.E.E.E. 802.11, 802.11a, 802.11b, 802.11g, 802.11n, 802.16 and 802.20.

137. The apparatus of claim 119, wherein the apparatus comprises a semiconductor device.

138. A system for allocating bandwidth in a network, comprising:
monitoring means for monitoring the network; and
a plurality of means for communicating information in communication with the monitoring means,
wherein during a measurement period, the monitoring means monitors an amount of information communicated by each of the plurality of communicating means to determine bandwidth required by each of the plurality of communicating means, and
wherein after the measurement period, the monitoring means transmits a bandwidth allocation message to the plurality of communicating means allocating bandwidth to each of the plurality of communicating means for transmitting information during respective timeslots specified in the bandwidth allocation message.

139. The system of claim 138, wherein the monitoring means comprises an access point.

140. The system of claim 138, wherein the network comprises a wireless local area network.

141. The system of claim 138, wherein the system is compatible with a standard selected from the group consisting of I.E.E.E. 802.11, 802.11a, 802.11b, 802.11g, 802.11n, 802.16 and 802.20.

142. A computer program stored on a computer-readable medium and executed by a processor for allocating bandwidth in a network, the computer program performing the steps of:
a.) establishing a measurement period;
b.) receiving an indication of an amount of information communicated in the network during the measurement period;
c.) determining bandwidth required for communicating information in the network; and
d.) generating a bandwidth allocation message, after the measurement period, allocating bandwidth for transmitting information during respective timeslots specified in the bandwidth allocation message.

143. The computer program of claim 142, wherein during the measurement period, the information is communicated using a predetermined communication protocol.

144. The computer program of claim 143, wherein the predetermined communication protocol comprises carrier sense multiple access with collision avoidance (CSMA/CA).

145. The computer program of claim 142, wherein the bandwidth allocation message comprises a traffic indication map and a bandwidth assignment table.

146. The computer program of claim 145, wherein the bandwidth allocation message comprises a header that indicates at least a type of message.

147. The computer program of claim 146, wherein the header comprises an I.E.E.E. 802.11 medium access control (MAC) header.

148. The computer program of claim 146, wherein the header includes a retry flag that indicates retransmission of information.

149. The computer program of claim 146, wherein the header includes a more flag that indicates that additional information is to be transmitted.

150. The computer program of claim 146, wherein the bandwidth allocation message comprises a checksum.

151. The computer program of claim 145, wherein the traffic indication map identifies stations allocated at least one timeslot.

152. The computer program of claim 145, wherein the bandwidth assignment table comprises at least one timeslot allocation pair, and wherein the at least one timeslot allocation pair comprises an identification portion and a timeslot allocation portion.

153. The computer program of claim 152, wherein the identification portion identifies a station allocated at least one timeslot.

154. The computer program of claim 152, wherein the timeslot allocation portion contains a number of timeslots allocated for transmitting information.

155. The computer program of claim 145, wherein information is communicated in an order specified in the bandwidth assignment table.

156. The computer program of claim 142, wherein the network comprises a wireless local area network.

157. The computer program of claim 142, wherein the steps performed by the computer program are compatible with a standard selected from the group consisting of I.E.E.E. 802.11, 802.11a, 802.11b, 802.11g, 802.11n, 802.16 and 802.20.

158. A computer program stored on a computer-readable medium and executed by a processor for allocating bandwidth in a network, the computer program performing the steps of:
  a.) providing information for transmission during a measurement period; and
  b.) receiving a bandwidth allocation message, after the measurement period, allocating bandwidth for transmitting information during respective timeslots specified in the bandwidth allocation message,
  wherein allocation of timeslots in the bandwidth allocation message is based on an amount of information transmitted during the measurement period.

159. The computer program of claim 158, wherein during the measurement period, the information is transmitted using a predetermined communication protocol.

160. The computer program of claim 159, wherein the predetermined communication protocol comprises carrier sense multiple access with collision avoidance (CSMA/CA).

161. The computer program of claim 158, wherein the bandwidth allocation message comprises a traffic indication map and a bandwidth assignment table.

162. The computer program of claim 161, wherein the bandwidth allocation message comprises a header that indicates at least a type of message.

163. The computer program of claim 162, wherein the header comprises an I.E.E.E. 802.11 medium access control (MAC) header.

164. The computer program of claim 162, wherein the header includes a retry flag that indicates retransmission of information.

165. The computer program of claim 162, wherein the header includes a more flag that indicates that additional information is to be transmitted.

166. The computer program of claim 165, wherein the computer program performs the step of:
  c.) generating a null information packet with the more flag set, when the amount of information to be communicated exceeds allocated timeslots.

167. The computer program of claim 162, wherein the bandwidth allocation message comprises a checksum.

168. The computer program of claim 161, wherein the traffic indication map identifies stations allocated at least one timeslot.

169. The computer program of claim 161, wherein the bandwidth assignment table comprises at least one timeslot allocation pair, and wherein the at least one timeslot allocation pair comprises an identification portion and a timeslot allocation portion.

170. The computer program of claim 169, wherein the identification portion identifies a station allocated at least one timeslot.

171. The computer program of claim 169, wherein the timeslot allocation portion contains a number of timeslots allocated for transmitting information.

172. The computer program of claim 161, wherein information is transmitted in an order specified in the bandwidth assignment table.

173. The computer program of claim 158, wherein the computer program performs the step of:
  c.) generating a signal to enter a power-save mode for a predetermined length of time, when no timeslots are allocated in the bandwidth allocation message.

174. The computer program of claim 158, wherein the computer program performs the step of:
  c.) generating a null information packet to indicate an end of transmission, when the amount of information communicated is less than the timeslots allocated.

175. The computer program of claim 158, wherein the network comprises a wireless local area network.

176. The computer program of claim 158, wherein the steps performed by the computer program are compatible with a standard selected from the group consisting of I.E.E.E. 802.11, 802.11a, 802.11b, 802.11g, 802.11n, 802.16 and 802.20.

177. A computer program stored on a computer-readable medium and executed by a processor for allocating bandwidth in a network, the computer program performing the steps of:
  a.) establishing a measurement period;
  b.) providing information for transmission during the measurement period;
  c.) receiving an indication of an amount of information transmitted in the network during the measurement period;
  d.) determining bandwidth required for transmitting information in the network based on an amount of information transmitted during the measurement period; and
  e.) generating a bandwidth allocation message, after the measurement period, allocating bandwidth for transmitting information during respective timeslots specified in the bandwidth allocation message.

178. The computer program of claim 177, wherein the steps performed by the computer program are compatible with a standard selected from the group consisting of I.E.E.E. 802.11, 802.11a, 802.11b, 802.11g, 802.11n, 802.16 and 802.20.

* * * * *